(12) United States Patent
Van Loo et al.

(10) Patent No.: US 9,628,622 B1
(45) Date of Patent: Apr. 18, 2017

(54) SYSTEM AND METHOD FOR UNIVERSAL PUBLIC ACCESS COMMUNICATION ADAPTIVELY INTEGRATING DISPARATE MODES OF COMMUNICATION

(71) Applicant: FREQUENTIS AG, Vienna (AT)

(72) Inventors: Reinard Van Loo, Vienna (AT); Johann Marinits, Vienna (AT); Heidelinde Kranzl, Vienna (AT); Gerd Palmetzhofer, Vienna (AT)

(73) Assignee: Frequentis AG, Vienna (AT)

( * ) Notice: Subject to any disclaimer, the term of this patent is extended or adjusted under 35 U.S.C. 154(b) by 43 days.

(21) Appl. No.: 14/675,833

(22) Filed: Apr. 1, 2015

Related U.S. Application Data

(60) Provisional application No. 61/973,713, filed on Apr. 1, 2014, provisional application No. 61/973,717, filed on Apr. 1, 2014.

(51) Int. Cl.
 *H04M 3/51* (2006.01)
 *G06F 3/0484* (2013.01)
 *G06F 3/0481* (2013.01)

(52) U.S. Cl.
 CPC ........ *H04M 3/5133* (2013.01); *G06F 3/0481* (2013.01); *G06F 3/04842* (2013.01)

(58) Field of Classification Search
 USPC .................................................. 379/265.02
 See application file for complete search history.

(56) References Cited

U.S. PATENT DOCUMENTS

2012/0320912 A1* 12/2012 Estrada ................ H04M 3/5116
 370/389
2014/0148117 A1* 5/2014 Basore .................... H04W 4/22
 455/404.1

* cited by examiner

*Primary Examiner* — Amal Zenati
(74) *Attorney, Agent, or Firm* — Rosenberg, Klein & Lee

(57) ABSTRACT

A system is provided for universal public access communication adaptively integrating disparate modes of communication. At least one operator workstation is linked to a public access point for selective interactive communication with remotely disposed caller units in a plurality of selectable communication modes. A backend processing system for the public access point adaptively generates dynamic operator sessions for the operator workstation with the remote caller units. Each dynamic operator session selectively integrates one or more communication modes to preserve compatibility with external messages transmitted by the remote caller units. A plurality of logic service modules are each executable in the backend processing system for control a portion of the sessions, and corresponding gateways are configured to convert between external messages in the communication modes and internal messages having at least one predetermined format. A plurality of adapters execute in the backend system to mediate between gateways and logic service modules.

20 Claims, 18 Drawing Sheets

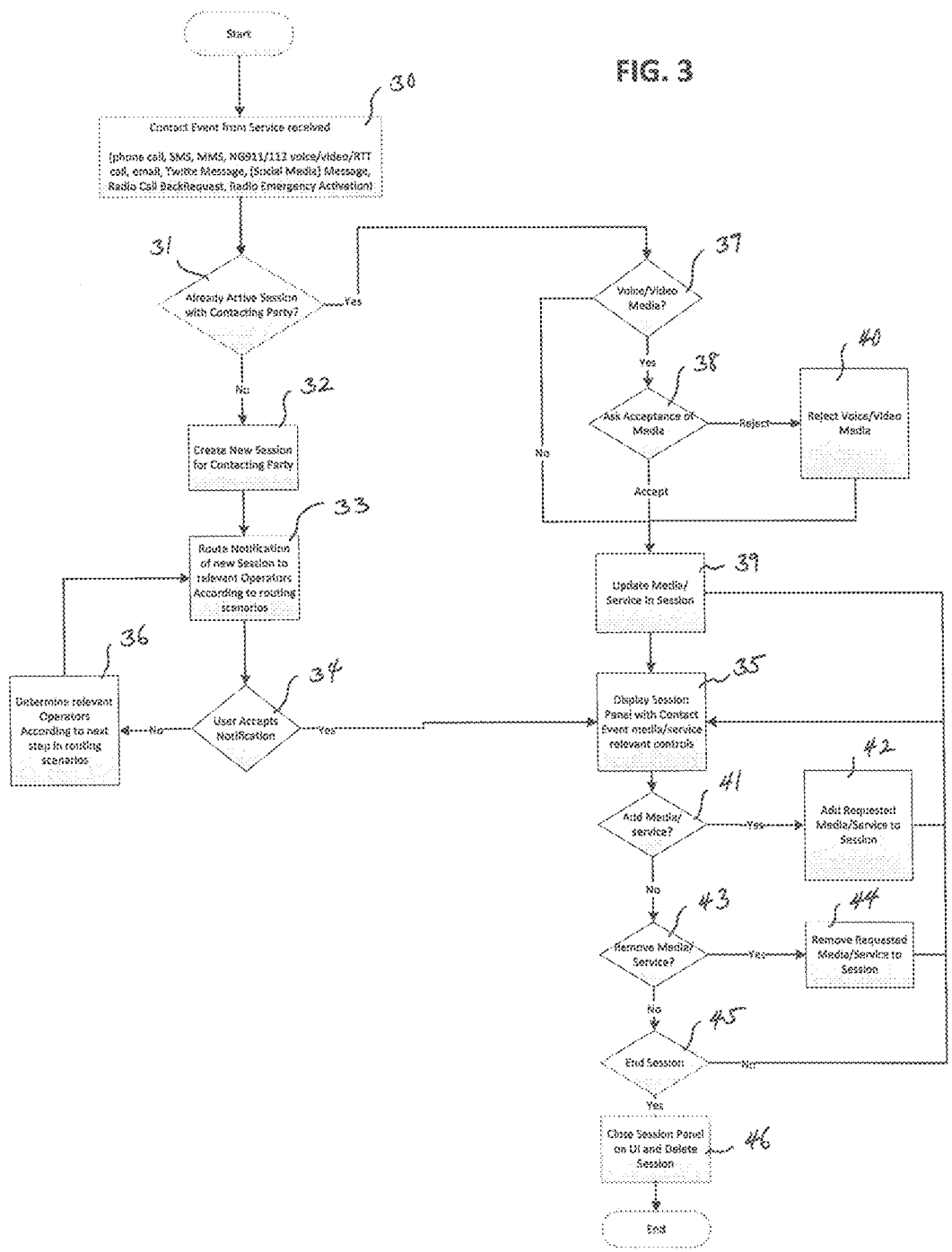

SYSTEM AND METHOD FOR UNIVERSAL PUBLIC ACCESS COMMUNICATION ADAPTIVELY INTEGRATING DISPARATE MODES OF COMMUNICATION

RELATED APPLICATION DATA

This Application is based on Provisional Patent Application No. 61/973,713, filed 1 Apr. 2014, and Provisional Patent Application No. 61/973,717, also filed 1 Apr. 2014.

BACKGROUND OF THE INVENTION

The present invention is generally directed to providing an effective public access communication system. More specifically, it is directed to a system and method which provide for universal public access communication which adaptively integrates the disparate modes of communication that members of the public may variously use. The system and method accordingly provide for highly versatile public access communication in numerous applications where minimally restricted, at large access is publicly provided for interactive communication sessions with a designated contact point(s). One notable example of such applications is found in public safety access points which handle emergency response communications with members of the public.

Public Safety Access Points (PSAPs), or emergency answer/dispatch centers, handle incoming requests from the public for help, either in cases of emergency or less critical situations, and promptly arrange for emergency personnel response to callers' locations as needed. Currently, communicating with members of the public in this context typically takes place using telephony style voice calls. Other modes of communication, such as various communication media messages (video, text and pictures) and other communication services' messages (via social media, messaging services like email, SMS, WHATSAPP, etc., and audio/video communication services like SKYPE, etc.) are now widely used by the public. Yet, no sufficiently effective provisions are available for readily communicating with PSAPs using these media, services, and such other common modes of communication.

Public access communication facilities—like emergency dispatch centers in public safety-related applications—not only communicate with the public, they generally also manage the emergency responders. Several known standards exist for emergency communications: TETRA standard emergency voice calls, High priority Call back request status data messages, Mobile Data Terminal initiated Emergency requests, Analog system proprietary emergency calls, future LTE based multi-media emergency calls and requests, etc.

Equipment currently used by dispatch operators and emergency responders tend to be focused on voice communication only. To exchange messages of communication modes other than voice (such as video, text email, pictures, etc.), additional devices are used which are not integrated in an available solution and therefore tend to break the normal workflow. For example, a call center operator may have to separately send a picture of a crime suspect to a responding public safety officer in an 'off-line' manner, perhaps by sending to the officer's private smartphone via e-mail. Also, currently known solutions make it difficult to provide integrated mobile dispatch messages or home-office remote working positions during a call session due to heterogeneous end user devices that remain "not part of the system."

There is therefore a need for a system and method which provide effective yet highly versatile management of public access communication in various applications such as these. There is a need for a system and method that provide for universal public access communication compatible with the various modes of communication typically used by members of the public.

SUMMARY OF THE INVENTION

It is an object of the present invention to provide a system and method which enables such universal public access communication, and does so in highly effective yet reliable manner.

It is another object of the present invention to provide a system and method for public access communication which adaptively integrates disparate modes of communication, to facilitate interactive communication with a remote member of the public in one or more of the disparate communication modes.

It is yet another object of the present invention to provide a system and method for public access communication which dynamically manages public access communication sessions occurring interactively in any of the disparate communication modes with remote parties.

One or more of these and other objects are attained in a system formed in accordance with certain embodiments of the present invention for universal public access communication adaptively integrating disparate modes of communication. The system comprises at least one operator workstation linked to a public access point for selective interactive communication with remotely disposed caller units in a plurality of selectable communication modes. The communication modes include at least: predetermined voice, data, communication media, and communication service transmissions. The system also comprises a backend processing system for the public access point, which backend processing system executes to adaptively generate dynamic operator sessions for the operator workstation with the remote caller units. Each dynamic operator session selectively integrates one or more of the communication modes to preserve compatibility with external messages transmitted by the remote caller units. The backend processing system includes a plurality of logic service modules each executable to control a portion of the dynamic operator sessions, and a plurality of gateways respectively configured to convert between the external messages exchanged with remote caller units in the communication modes and with corresponding internal messages having at least one predetermined backend format. A plurality of adapters executes in the backend system to mediate between the gateways and logic service modules. The adapters selectively distribute the internal messages from the gateways to one or more of the logic service modules for responsive actuation thereof.

In accordance with certain embodiments and applications, a system is provided for universal public access communication adaptively harmonized to disparate modes of communication. The system comprises at least one operator workstation linked to a public access point for selective interactive communication with remotely disposed caller units in a plurality of selectable communication modes. The communication modes include at least: predetermined voice, data, communication media, and communication service transmissions. The system further comprises a backend processing system for the public access point, which backend processing system executes to adaptively generate dynamic operator sessions for the operator workstation with the remote caller units. Each dynamic operator session selectively integrates one or more of the communication modes to preserve compatibility with external messages transmitted by the remote caller units. The backend processing system includes a main subsystem and a media subsystem. The main subsystem includes a plurality of core logic service modules each executable to control a portion of the dynamic operator sessions, and a plurality of data gateways respectively configured to convert between: the external messages exchanged with remote caller units in preselected ones of the communication modes, and corresponding internal messages having a first backend format. A plurality of adapters execute to mediate between the data gateways and core logic service modules, which adapters selectively distribute the internal messages from the data gateways to one or more of the core logic service modules for responsive actuation thereof. The media subsystem includes a plurality of media gateways respectively configured to convert between: the external messages exchanged with remote caller units as communication media transmissions, and corresponding internal messages having at least a second backend format. A plurality of media streaming service modules each execute to adaptively mix communication media content of the internal messages of the media gateways. The media streaming service modules preserve compatibility with one or more predetermined media endpoint devices.

In accordance with certain other embodiments and applications, a method provides for universal public access communication adaptively integrating disparate modes of communication. The method comprises establishing at least one operator workstation linked to a public access point for selective interactive communication with remotely disposed caller units in a plurality of selectable communication modes. The communication modes include at least: predetermined voice, data, communication media, and communication service transmissions. A backend processing system configured for the public access point is executed to adaptively generate for the operator workstation dynamic operator sessions with the remote caller units. Each dynamic operator session is configured to selectively integrate one or more of the communication modes to preserve compatibility with external messages transmitted by the remote caller units. The backend processing system is actuated to selectively execute a plurality of logic service modules, each of which is executable to control a portion of the dynamic operator sessions. A plurality of gateways are executed to respectively convert between the external messages exchanged with remote caller units in the communication modes and corresponding internal messages having at least one predetermined backend format. A plurality of adapters mediate between the gateways and logic service modules. Such adapters selectively distributing the internal messages from the gateways to one or more of the logic service modules for responsive actuation thereof.

BRIEF DESCRIPTION OF THE DRAWINGS

FIG. 3 is a flow diagram illustrating a process for initiating and maintaining an interactive communication session, in accordance with one exemplary embodiment of the present invention;

DETAILED DESCRIPTION OF THE PREFERRED EMBODIMENTS

Figure 1:
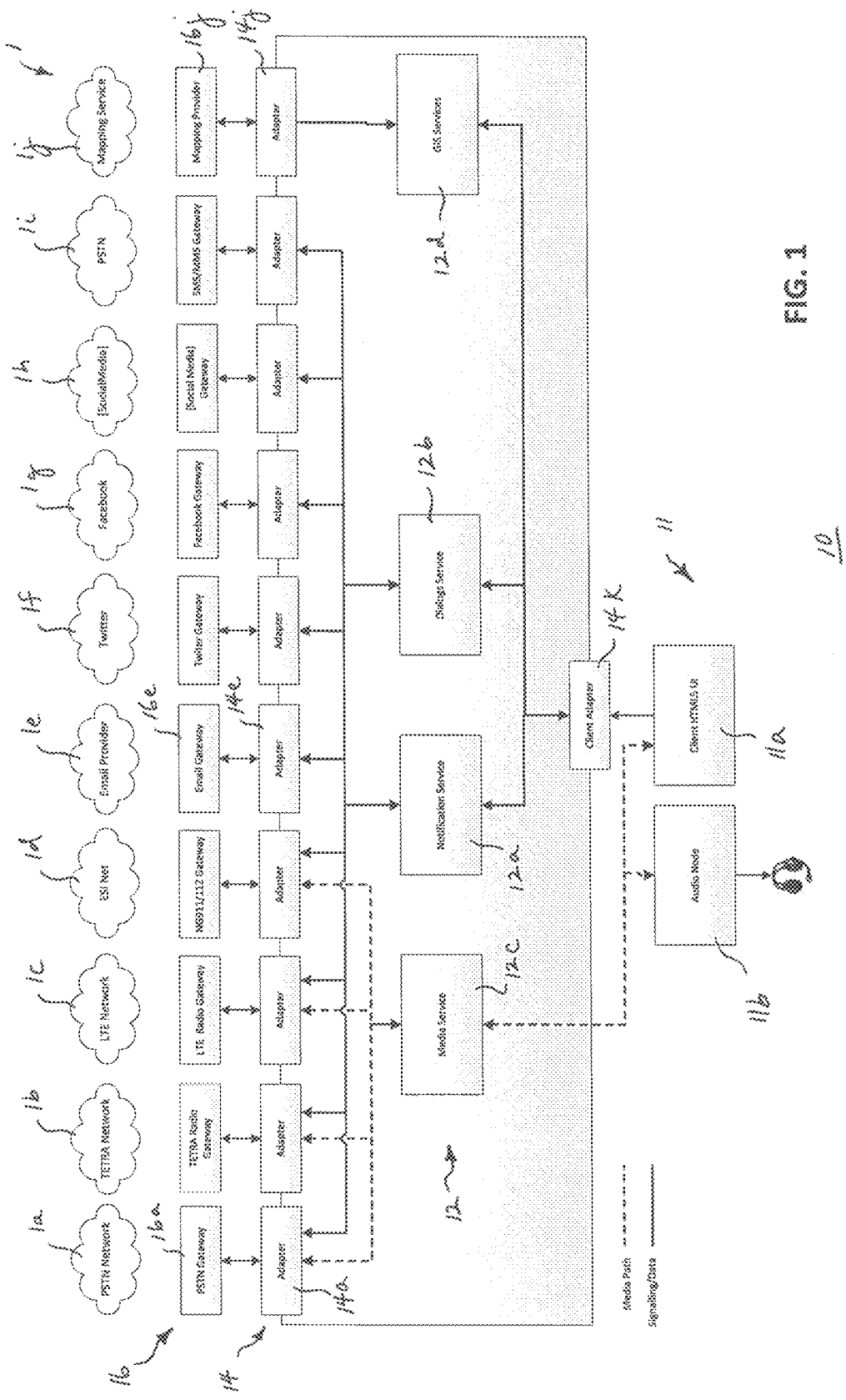
FIG. 1 is a schematic diagram illustrating a general overview of a system formed in accordance with one exemplary embodiment of the present invention.

Generally, a system and method formed in accordance with certain exemplary embodiments of the present invention serve to provide an effective public access communication system which seamlessly integrates various modes of communication in handling interactive sessions with members of the relevant public. The system and method in this manner provide for universal public access communication which adaptively integrates the disparate modes of communication typically used by members of the public to adroitly receive, respond to, or otherwise manage communication sessions with remote parties using various types of caller units on their end. The system and method readily recognize and convert incoming external messages received from the various caller units in different communication modes to certain internal message format(s) to establish dynamic communication sessions, in which user interfaces suitably incorporate the message contents for composite audio-visual presentation at a designated operator workstation. Conversely, the system and method operate to suitably convert internal messages generated in connection with the dynamic communication session to outgoing messages in the communication modes employed by the recipient units.

The subject system and method may be suitably adapted for any application requiring robust, highly versatile public access communication where minimally restricted, at large access is publicly provided for interactive communication sessions with a designated contact point(s). Public safety applications provide one example, where PSAP facilities serve given areas/jurisdictions, handling emergency response communications with members of the public.

These PSAP facilities are where emergency calls presently terminate, and from which police, fire, rescue, and other public safety response resources are dispatched. Given the proliferation of various communication modes, the subject system and method in the disclosed embodiment equips and configures such PSAP facilities to not only receive emergency calls/requests by conventional telephone call, but also by other means including but not limited to video calls, pure text messages, email messages, and other communication modes available in the consumer world.

In the United States, for example, when an individual dials 911 the call is routed to a PSAP facility, where a PSAP operator then speaks to the individual through the ensuing call session, asking him/her to identify the emergency and verbally obtaining pertinent information. The pertinent facts are presently gathered by PSAPs this way using voice communication exclusively, but the subject system and method extend a PSAP's capabilities to handle other communication modes by which the pertinent information is gathered, such as through video and text messages. To do that effectively, the PSAP must be versatile enough to handle the video, text, and other modes of communication as such, and present their information content to the operator in a neatly integrated way. The landscape of social media and other communication modes is constantly changing with platforms appearing, establishing themselves, then perhaps declining. The subject system and method thus work universally in conjunction with and adapting to this changing landscape.

In the PSAP, a workstation operator may be confronted not only with incoming telephony calls, but also SMS-to-911 messages and events transmitted through social media. It is not only important in that context to recognize the media and services through which messages are provided, but other information like the location of the requestor and any additional profile information (personal addresses, health and/or "in case of emergency" contact information) is of importance to the PSAP. Internationally, several mechanisms exist to retrieve this information for telephony calls, for example, ANI/ALI in the USA, EISEC/ALSEC in the UK and other country specific methods. With the advent of the NG911 (USA) and NG112 (EU) standards this information is made available for NG911/112 service-standard conforming audio, video, and text calls. Thus, a PSAP workstation operator will typically have available the location and profile information accessible through Geographic Information System, ANI/ALI terminal, or web-browser access to a profile data provider.

Also in a PSAP, requests for help are not only received from the public, but also from first responders who are managed by the PSAP. Communication in that context may be supported by: TETRA standard emergency voice calls, High priority Call back request status data messages, Mobile Data Terminal initiated Emergency requests, Analog system proprietary emergency calls, future LTE based multi-media emergency calls and requests, or the like. A PSAP workstation operator may access these types of requests through such applications as an Integrated Communication Control System (ICCS) supporting communications through radio, a GIS indicating the location of the first responder, or the like.

Presently known PSAP facilities at best merely aggregate separate applications to handle these types of calls/requests presented to operators, applications like: a SKYPE or other VOIP application, a phone application, a texting web-based application, or the like. They are not integrated, and an operator must make provision to manually identify and select each appropriate application, then separately utilize as needed. In accordance with certain aspects of the present invention, the subject system and method not only provide for such capabilities, they adaptively integrate them as needed for concurrent use in formulating as composite presentation to the operator for ready access in handling an emergency call, or request, session. Thus, a caller having a dialogue with an operator may use voice, video, text, or other available mode of communication through a system implemented in accordance with the illustrated embodiment. Regardless of the particular mode(s) of communication employed by a remote caller/requestor, the system adapts to integrate the full message content into a multi-mode user interface dynamically generated for the operator during an ensuing communication session.

The communication modes supported by the system include in addition to voice, and audio or video media, text messaging, social media messaging, and the like. Future 911 service standards are expected to support such modes. From the user's perspective (be it the PSAP operator, caller, first responder, or others), they need not know what particular service supports or defines a given message. A caller or operator may, for instance, just select from the available communication modes ad simply change or add a mode to a session. For example, a caller may add video or text message to supplement an already active session initiated originally by a telephone call. The 911 operator would not be concerned about the manner in which particular information is transmitted, so long as the information is transmitted in an effective and clear manner. That is, regardless of how the message comes in to the operator, the interface will appear largely consistent with additional message content supplementing the information already obtained and presented at the operator workstation.

A system realized in accordance with one exemplary embodiment of the present invention generally includes one or more operator workstations served by a backend processing system to generate and manage various dynamic operator sessions as needed, with remotely disposed parties and/or other personnel. As illustrated for a public safety access application, each operator workstation is associated with a PSAP, and is supported by that PSAP's backend processing system. The operator workstation is thereby equipped to activate multiple, even concurrent, dynamic operator sessions with members of the public calling into the PSAP and/or with first responder personnel like law enforcement, fire, and medical professionals. The operator workstation establishes dynamic operator sessions with one or more remote caller units which, as used herein, refer to communications devices/equipment employed by members of the public calling into the public access communication system, first responder personnel, or other parties remotely disposed from the operator workstation.

Each dynamic operator session establishes an interactive communication session adaptively incorporating all message content received or generated in connection with that session, regardless of the contents' communication mode. Each dynamic operator session thus includes the generation of a multi-mode user interface through which the applicable message contents are suitably integrated into a composite audio-visual presentation for the operator. Active dynamic operator sessions at an operator workstation may be automatically interrupted where other emergency notifications are directed to that workstation or operator in any of the various communication modes, so that the multi-mode user interface may be updated to include one or more corresponding graphic notification windows.

Briefly, the system includes a plurality of logic service modules implemented in suitable computer software and hardware, which are maintained at the backend processing system. The logic service modules are variously executable establish and control the dynamic operator sessions through each operator workstation served by the backend processing system. The logic service modules are programmably implemented in suitable manner to be generically applicable to carry out their respective operations/functions in various settings and contexts, and for various particular end uses. They are modularized in this regard for use with different application-specific infrastructures. The system thus provides for a plurality of suitably configured gateways and adapters which cooperatively bridge the operational/configurational gap between the logic service modules and the given application's system infrastructure.

FIG. 1 schematically illustrates a general overview of a system 10 implemented in accordance with one exemplary embodiment of the present invention. System 10 includes one or more clients 11, such as software/hardware implemented applications running at PSAP operator workstations and on the various data endpoint devices available there (the audio node 11b shown, for example, run for a pair of headphones), served by a backend processing system selectively executing a plurality of predefined logic service modules 12. System 10 also includes a plurality of gateways 16, each of which is preferably dedicated to translating/converting between external message signals of various communication modes 1 and internal message signals of predetermined backend format(s). The gateways 16 preferably serve both incoming and outgoing messages, and collectively provide for all communication modes reasonably available to the public in the given region of operation. System 10 further includes a plurality of adapters 14 which mediate between the logic service modules and gateways 16, as needed, so that appropriate distribution of internal messages (as converted by certain gateways or to be converted thereby) to/from the appropriate logic service modules occurs. The adapters 14 preferably also provide any further protocol conversions may be necessary for proper interfacing between the gateways or internal service modules and the logic service modules 12. The operational flow paths for signals and messages between these various system portions when operably intercoupled are shown.

Each of the cloud-shaped blocks 1 represents a communications mode through which an incoming message (call or other voice/data communication collectively referred to herein as "message") is received. These communication modes include different voice transmission networks (wired or wireless), communication media, and communication services that may be widely available to the public in various geographic regions. The four networks shown, PSTN, TTRA, LTE, NG911/112, are examples of primary services presently available for providing audio and video, and the other service-based modes provide primarily data-based message transmissions. Certain of these communication mode examples are defined below.

(1) PSTN (Public Service Telephone Network)

(2) TETRA (Terrestrial Trunked Radio): A tactical radio system used by public safety agencies in Europe; similar to P25 (tactical radio network) employed in North America.

(3) LTE (Long Term Evolution): A format that is likely to be used in the future for public safety as well as for the replacement of tactical radio networks (TETRA).

(4) ESI (Electronically Stored Information): A next generation 911 (NG911) or next generation 112 (NG112) format. The NG112 program is the European version, and the NG911 program is the North American version.

(5) Email Provider (6) TWITTER, FACEBOOK, and other social media: If a user on TWITTER sends a tweet to a specific mobile hashtag (the hashtag serving to uniquely address the PSAP), the tweet may be received and treated by the PSAP much as any other incoming call for help. Social media, such as FACEBOOK, would provide means of communication in a similar manner. Other social media outlets that may appear in the future would also enable communication by using hashtags or other suitable addressing schemes.

(7) SMS/MMS: Provides data for transmission of text messages, as well as video media messages.

(8) Mapping Service: Provides geographic location of the sender utilizing for example, GOOGLE MAPS or other similar local mapping provider services.

System 10, among other things, harmonizes the presentation of message content received/transmitted in such different communication modes. Whether through a telephone network, a radio network, or other various communications mediums using other formats and protocols, a remote caller using any conventionally known caller unit may consistently connect to the PSAP, which recognizes and seamlessly handles the connection ('call').

Members of the public may also contact the PSAP via conventional telephone lines. System 10 thus provides a universal, effectively standardized way for the public to contact the PSAP, whether they are using video calls, texting, connecting through social media outlets, or the like. This preferably accommodates the network communications standards, such as for example emergency services networks which may provide videos, text calls, video calls, as well as voice calls from the public using the NG112 or other standard.

As noted, each of the communication modes 1 supported by system 10 is preferably served by a dedicated gateway 16, with the exception of the mapping service, which is supported through a mapping provider of any suitable type known in the art. In each of the gateways 16, as in the example of protocol conversion, the gateway takes external messages in the PSTN, text, phone, network, or other communication mode it is dedicated for and transforms them into a common predetermined protocol for use by the backend processing system to carry out further PSAP processing. Behind this is complete software/hardware architecture. The functionality of each dedicated gateway 16 is largely uniform. Preferably, the protocols and message formats they handle may vary, but the overall transceiving function and internal components of the dedicated gateways 16 remain generally consistent.

Figure 2A:
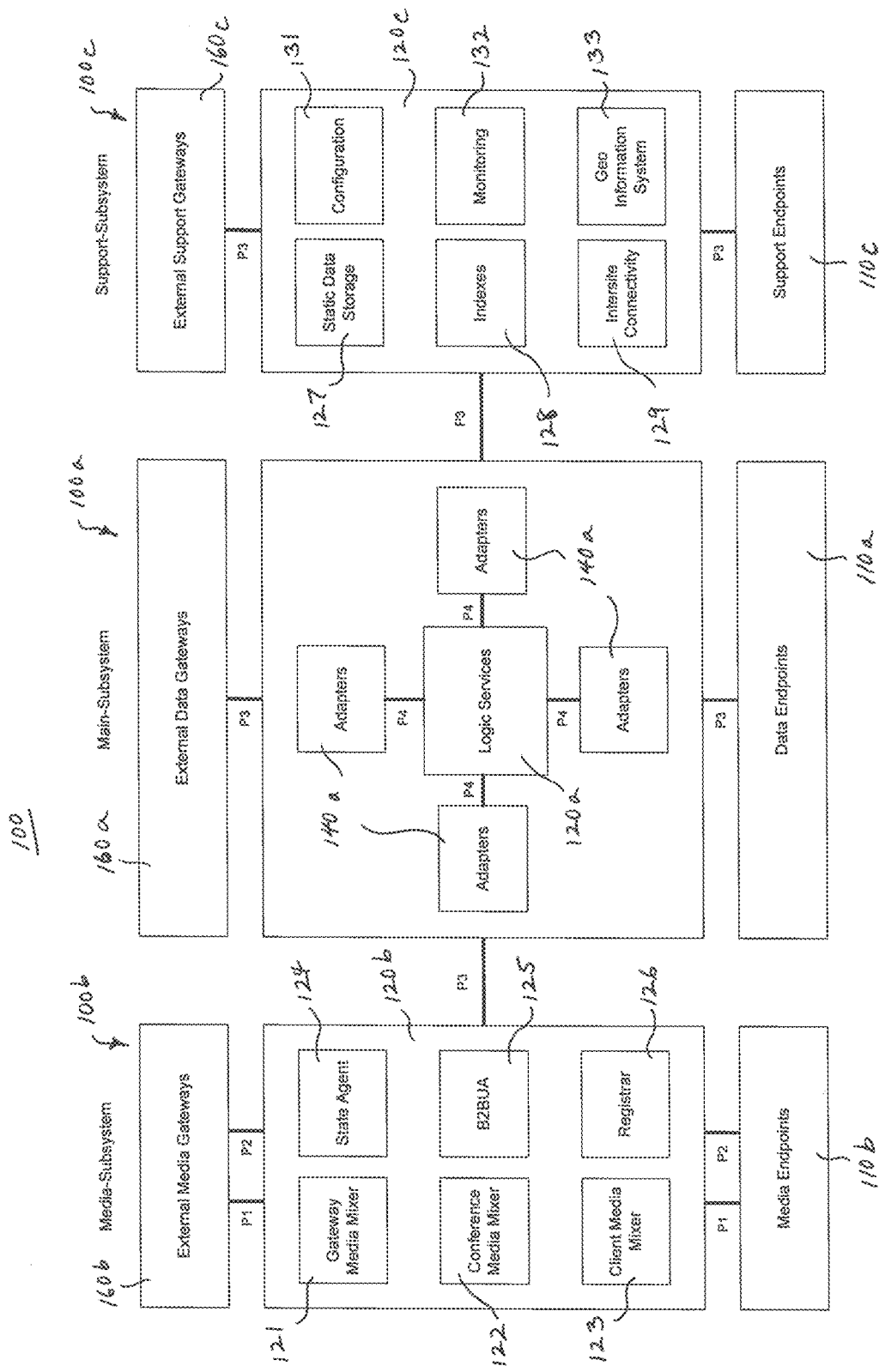
FIG. 2A is a schematic diagram illustrating, in high level logical architectural form, a backend processing system formed in accordance with one exemplary embodiment of the present invention.

FIG. 2A schematically illustrates in high level logical architectural form the backend processing system 100 employed by system 10. The backend processing system 100 in this embodiment includes a main subsystem 100a to which a media subsystem 100b and a support subsystem 100c are coupled. Each of the subsystems is served by certain of the gateways 160a, 160b, 160c. The gateways 160a for the main subsystem generally carry out suitable translation/conversion of messages transceived in data form, while the gateways 160b of the media subsystem carry out suitable translation/conversion for the messages transceived in audio or video media form. The internal protocols to which the gateways convert incoming communications are preferably of known predetermined standards. In the exemplary embodiment and application shown, all audio, data, and media messages are preferably though not necessarily converted to RTP (Real Time Protocol) streams, a currently prevalent standard for media to be streamed on IP networks.

The service modules 120b shown in the media subsystem 100b indicate low level services which are needed to carry out basic media handling.

The data gateways of the main subsystem 100a preferably provide not only converted data content from external messages, but also any meta-information, preferably over HTML or the like. The main subsystem 100a thus converts data messages from whatever standard is selected for use, and its adapters 140a then bridge the gap between its core logic service modules 120a and surrounding infrastructure by mediating therebetween.

To illustrate operation in this regard, take for example the case of a TWITTER message (a tweet) being received by system 10, where a remote caller connects through the TWITTER service by way of the TWITTER dedicated gateway 160a. When the tweet is received via the TWITTER service, the given gateway receives an event play indicating, for instance, "I have a new tweet for this PSAP." The gateway 160a does suitable transforming of the event into a data structure such as, for example, HTML and sends the same on to other portions of the main subsystem 100a. The main subsystem 100a includes the core logic service modules necessary to generate and control dynamic operator sessions. For example, one logic service module manages the locations of users and another logic service module manages dialogues occurring in the dynamic sessions with remote callers. The incoming tweet needs to be served through several such logic service modules. A suitable adapter(s) 140a provide the necessary mediation in this regard.

When the TWITTER gateway 160a receives an event indicating, for instance, "I have a new tweet." The adapter(s) 140a may determine that certain other internal logic service modules are interested in this tweet, and operate to distribute to such other internal logic service modules only those parts of the message they need. A notification service module (such as shown in FIG. 1) may get the event indication that the received message is a tweet. The support subsystem 100c may access an external location service to provide indication of the tweet's geographic origin. A session service module of the main subsystem 100a may be executed to help obtain more information.

When the incoming tweet is received, it is in most cases first sent to an operator work station. Then, an operator may accept the message in much the manner he/she would accept a call, so as to initiate a dialogue. The session service module, recognizing this, starts requesting additional information via the appropriate adapter 140a and TWITTER gateway 160a from the TWITTER service, transmitting such questions as, for example, "please provide more information about the person sending this tweet."

Several operations take place simultaneously in this regard. The adapter(s) 140a manages the internal distribution between service and incoming tweet. The gateway 160a receives tweets and sends them on to the adapter(s). The adapter(s) on the other hand bridges the gap, knowing which of the logic service modules need this information, then mediates to keep the logic service modules decoupled from the gateway(s).

The core logic service modules 120a provided in the main subsystem 100a execute to generate and control the dynamic communication sessions established at the operator workstations. The adapters 140a are configured through suitable software and hardware to effectively carry out the interfacing functions required for the given application's particular infrastructure. In the particular tweet message example, if a session is ongoing with the sender of the initial tweet, any subsequent tweet is added to that session internally. If a telephone number is known and a voice telephone connection has been concurrently established, media may be added to the session, the call may be placed on hold, and a further twitter message may be sent between the original sender and the session's operator. FIG. 7F illustrates such case of a TWITTER chat where an ongoing voice chat has also been initiated between the caller and operator, all of which takes place in one session.

Once such tweet or other message comes in, a new dynamic operator session is created at an operator workstation for the contacting party. An interactive operator session is thus dynamically created for the contacting party and operator. A notification of the new operator session may be routed to alert other operators, but not all operators need to receive all tweet messages. If an operator accepts, then that operator's workstation displays a multi-mode display session panel, preferably along with various event and media service-relevant controls.

Thus, upon receipt of a tweet, multiple operators may acknowledge and accept the call, much as with a phone call, agreeing to accept handling of the emergency situation presented. A reply message may then be sent back to the contacting party via text message for instance (as FIG. 7F illustrates), and the interactive communication session proceeds.

The operations described for this particular tweet example are reflected in FIG. 3, which shows a flow of processes carried out during operation of system 1 in one exemplary embodiment. An interactive communication session is initiated at block 30 upon receipt of an incoming message through one of the communication modes 1 (FIG. 1). If there is already an active session ongoing with the remote caller (contacting party), a message newly-received from the same caller is just accepted for the ongoing session and thus made available for immediate display in the existing multi-mode user interface therefor, as indicated at block 31. This logic is carried out by one or more suitably configured core logic service modules. If no ongoing session exists, a new dynamic operator session is created at block 32 by the appropriate logic service module(s). Such logic service module(s) is preferably configured also to determine whether the newly-received message is to be added to an ongoing session or if it is unrelated enough a message to warrant the creation of a new dynamic operator session based on the message.

At block 33, a notification of the newly-created session is routed to relevant operators. This occurs based for instance on predefined routing scenarios adopted for the particular application and PSAP in question. If a notified operator accepts/acknowledges the notification at block 34, the newly-created session's multi-media user interface is accordingly updated at block 35 to display graphic indicia with operator controls relevant to the contact event media/service. Depending on the application, the accepting operator's own multi-media user interface may be suitably updated as well. If a notified operator does not accept/acknowledge the flow proceeds to block 36, where the relevant operators to further notify according to the next routing scenario step, if any, are determined for such further notification again at block 33.

If at block 31 an active communication session between the contacting party and operator is found to already exist, the flow proceeds to block 37, to determine if the received message would add a different mode of communication to the existing session. If so, the session and/or the operator is queried at block 38 as to whether the voice/video media or other additional communication mode is to be accepted. Where accepted, the flow proceeds to block 39, where the existing operator session is accordingly updated (such as through an additional graphic window or supplementation of an existing window) to reflect the additional communication mode's message content. Otherwise, the flow proceeds to block 40 to reject the newly-received message.

At block 37, the system determines if the newly-received message is of a voice/video media mode which warrants querying the operator about before actually adding to a session. The system makes such logic decision (such as, 'should the user be asked to accept the new video coming in or not'). If the operator is to be queries, the appropriate logic service module(s) receives the operator's input at block 38. If the operator responds in the affirmative ("yes"), the flow proceeds to block 39 for appropriate update of the existing operator session with the newly-received message content. If the given message is of communication media or service mode, block 39 invokes block 42, where the appropriate adapter(s) and logic service module(s) are executed to add the requested media/service to the session. Of course, all of the information to be added is obtained. Thereafter, the flow proceeds from block 39 to block 35 for update of the session's multi-mode user interface to include or modify any operator controls necessitated by any addition or other modification of the integrated communication modes. Typically, multiple logic service modules are concurrently executed during such processes to support the same session.

If it is determined at block 37 that the newly-received message is of a voice/video media mode which does not warrant querying the operator about beforehand, the flow proceeds to block 39 for appropriate update of the existing operator session with the newly-received message content. The flow proceeds from there to block 35 for update of the session's multi-mode user interface to include or modify any operator controls necessitated by any addition or other modification of the integrated communication modes.

Where certain communication media or service is to be added to an ongoing session (under various circumstances, even if not necessarily prompted by an incoming call or request), the system may—depending on the circumstances—query the operator or automatically determine at blocks 41 to "add media/service" for integration into the session. At block 42, the appropriate adapters and logic service modules are executed toward that end, such that the multi-media interface of the given session is updated to include the added media/service content. A graphic display window example of this is shown in FIG. 7G, where a mixed media conversation is handled simultaneously in one session.

Conversely, where certain communication media or service is to be removed from an ongoing session (under various circumstances), the system may be directed at blocks 43 to "remove media/service" from the session. The system responds accordingly at block 44, executing the appropriate adapters and logic service modules toward that end, such that the multi-media interface of the given session is updated to remove the added media/service content therefrom.

When it is desirable to end the session, the session is closed as indicated at blocks 45, 46 and deleted. At this point, any new session initiated by an incoming message from the same contacting party is viewed as a new contact.

For each of the decision points indicated in FIG. 3, processing preferably occurs in the logic service modules of the main subsystem 100*a*. The backend processing system's operation is supported and managed through the support subsystem 100*c*, which includes a plurality of support service modules implemented in suitable computer software and/or hardware. Such support service modules of support subsystem 100*c* include but are not limited to those configured, for example, to provide an account service (not shown in the drawings). This account service knows which operators are available to log on and to receive contacts from the public, and interacts accordingly with those logic service modules of the main subsystem 100*a* for controlling an operator session.

In cooperation with the account service provided by the support subsystem, for instance, a logic service module for controlling notifications may be executed to send a notification to a specified operator to notify them that a tweet, a telephone call, or other received message is waiting. At this time, a session logic service module may take over in response, noting that an operator has been notified and that it has determined it to be desirable to take the incoming message. Combined with geographic location information received through the support subsystem 100*c*, the session service module applies the available knowledge about the caller originating the message towards managing an ongoing session.

The various service modules preferably acquire needed information from the media gateways or the data gateways which they receive by the adapters much in the same manner that the media gateways notify relevant communication services about an incoming event. The different logic service modules of the subsystems 100*a*-100*c* make the logic decisions required during system operation, and the adapters maintain messaging to and from the logic service modules to the respective gateways. The gateways determine whether to connect to, for example, TWITTER, a telephone network, or any other communication mode outlet/resource.

In this regard, the adapters generally serve interface functions between the logic service modules and the various data resources. They provide an intermediate operational layer for the logic service modules, so they need not be locked into particular configurations specific to a particular application. That is, the modularity of the logic service modules is preserved to the extent reasonably possible. They are spared the configurational and processing burden of adapting to the particularly configured gateways of a given application otherwise required for direct communication therewith.

With reference to FIG. 2A, the single block indicated for the logic service modules is shown for explanatory purposes only and actually represents a plurality of modules configured to carry out different services. For example, 20-50 different services may be running in the background during system operation. The services provide different functionality to dynamically support an operator session, and the required control software is preferably implemented in such logic service modules of the main subsystem 100*a*. Further, each of the logic service modules is preferably supported by corresponding adapters. Again, the adapters' primary function is to enable these services configured to be as application-agnostic as possible (in other words, very generic) to work seamlessly with the particular types of gateways and the particular databases accessible to operator workstations of a particular PSAP facility.

In FIG. 2A, the external gateways and the different adapters and logic service modules of the media subsystem 100*b* lead to predetermined media endpoints provided for operator workstations in the given application. An example of such data endpoint is an audio node 13 indicated in FIG. 1. The main subsystem 100*a* and support subsystem 100*c* include respective the external gateways and logic service modules (many supported by different adapters) lead to predetermined data endpoints and support endpoints provided in the given application. As noted, the media subsystem 100b preferably operates to support signalling, streaming, and the like, employing amongst its logic service modules a gateway media mixer, conference media mixer, and client media mixer executed to carry out media streaming. The main subsystem 100a operates to actually control the dynamic operator sessions, including but not limited to what given sessions will look like (multi-mode user interface) and what kind of options are available o operators in communicating with remote callers.

Referring more closely to the block diagram of FIG. 2A, the backend processing system in the exemplary embodiment illustrated serves a number of clients supporting operator workstations linked thereto. The connections between the media, main, and support subsystems are preferably provided by the following protocols denoted in Table 1.

TABLE 1

Communications Protocol Examples between Backend Subsystems

| P1 | RTP | Media streaming protocol used within the media subsystem. |
|---|---|---|
| P2 | SIP | Media signaling protocol used within the media subsystem. |
| P3 | IP | Any IP based protocol used to connect the system to the external data gateways and endpoints as well as to the media and support subsystems. |
| P4 | MW | The middleware communication used between business logic services and adapters of the main system. |

Information enters the system in various communication mode messages through external gateways or endpoints. External gateways configured for media streaming are connected to the media subsystem 100b, and external gateways configured for data only interfaces are connected to the main system 100a. The support subsystem 100c also connects to external gateways. Relevant information from the media subsystem is published via appropriate adapters to the core logic services executed by the logic service modules of the main subsystem 100a. The media streams are routed from the external media gateways to media streaming service modules, which perform the requisite coupling, conferencing, and mixing of input streams and forward the mixed streams to media endpoints, which represent the media input and output devices of the clients. Relevant information from the support subsystem 100c is also published through appropriate adapters to the main subsystem's core logic services.

In accordance with this approach, the core logic service modules preferably have access to all the relevant data and state information available, and are configured to react based on this data and incoming events or requests. Information received through various channels may be thereby aggregated, correlated, and interpreted as needed, so that sophisticated core logic services may be carried out by respective modules based on the resulting data and events.

Data endpoints consume the core logic services and data from the system itself (e.g. originated by a user/operator interface client or a data client without a user/operator interface). Some services provided by logic service modules of the support subsystem 100c come with specific endpoints. One example is the Geo-Information System (GIS), which provides pertinent information along with a map UI control.

Adapters connect the main subsystem 100a to the other subsystems and to external systems. The adapters themselves do not contain any logic services, such that all dependencies preferably point from the adapters to the core logic services of the main subsystem. This keeps the core logic services central to the system and agnostic about its changeable environment.

The streaming and signaling services of the media subsystem 100b are preferably connected through adapters to the main subsystem 100a. This allows the media subsystem 100b to inform the main subsystem 100a about occurrences in the media subsystem and request the main subsystem to provide media routing and other core logic service decisions. On the other hand, the main subsystem 100a may access media functionality through appropriate adapters to control media streams and corresponding signaling.

Data, signaling, and media streaming are logically separated. This allows for different transport mechanisms and SLAs (service level agreements) for these very different types of information. It also allows for providing a wide range of options for the use of different endpoint devices, ranging from simple COTS VOIP, ISDN, GSM or analogue telephones to complex integrated operator workstations which support rich user interfaces, multiple audio/video devices, or any combinations of user interfaces (UIs) and streaming devices.

Subsystem Components and Intercoupling

Returning to FIG. 1, the specific components of the particular depicted embodiment will now be described in more detail.

As depicted, a plurality of logic service modules 12 include a notification service module 12a, a dialogs service module 12b, a media service module 12c, and a geographic information system (GIS) service module 12d. The logic service modules 12 may further include an account service module, a location service module, and a session service module (none of which are depicted), among others. A plurality of adapters 14 are each in communication with at least one of the logic service modules 12, and are also each in communication with at least one of a plurality of gateways 16 and/or clients 11.

Each of the gateways 16 receives a type of data resource from a plurality of communication modes 1. Preferably, each of the communication modes 1 has its own dedicated gateway. The communication modes 1 provide messages from remote caller units, or in the case of the mapping service 1j additional geographic information associated with remote caller units, each in a format associated with the communication mode.

The gateways 16 take the specifics of each message and convert it into a common data format. For instance, messages formed largely of text and text formatting might be converted to HTML. The gateways 16 then send the converted messages to the adapters 14 for processing and distribution.

Note that the term "gateway" for the plurality of gateways 16 is used for convenience, and certain of the gateways 16 may not be a gateway in the traditional sense, but nonetheless serve to receive and initially convert the data of the communication mode. For instance, the "gateway" for mapping service 1j may actually be the mapping provider 16j itself, or a portion thereof.

The adapters 14 distribute the messages to one or more of the logic service modules 12, serving interface functions (that is, mediation) between the logic service modules 12 and the various communication modes 1 received by the data gateways 16, so that the logic services 12 do not communicate directly with the data gateways 16. Only the parts of the message that are needed by each of the logic service modules 12 are sent.

As one example, one of the adapters 14 may determine that the notification service module 12a, the location service module, and the session service module are interested in a message. The notification service module 12a receives an event indication of the type of message and the source data resource, the location service module is signalled to provide indication of the origin of the message, and the session service module is signalled to obtain more information.

As a more general example, as depicted, data of an email message received by the email adapter 14e may be generally sent to both the notification service module 12a and the dialogs service module 12b. Data of a telephone call message received by the PSTN adapter 14a may also be generally sent to both the notification service module 12a and the dialogs service module 12b, but a media stream thereof (namely, the audio stream of the telephone call) may furthermore be sent to the media service module 12c. Mapping messages received by the mapping adapter 14j, meanwhile, may be generally sent solely to the GIS service module 12d, and to no other service module.

As noted in preceding paragraphs, communication modes 1 may include the depicted modes 1a-1j, which have been described above. Note that, in the depicted embodiment and sample application, the modes may be categorized as:

Four media communication modes: PSTN 1a, TETRA 1b, LTE 1c, and ESI 1d;

Five data communication modes: email service provider 1e, three social media sources 1f, 1g, 1h, and PSTN 1i specifically for SMS and MMS; and One support communication mode: mapping service 1j.

In the context of the architecture of FIG. 2A, the gateways corresponding to each such communication mode may therefore be accordingly categorized as data gateways 160a, media gateways 160b, or support gateways 160c.

Still other communication modes 1 of any of these categories, although not depicted, may exist in various implementations, for instance a video chat communication mode such as Skype, or a web-based messaging communication mode such as AOL Instant Messenger. Indeed, implementations of this and other embodiments of the invention may include communication modes not presently available, and an implementation may be further configured after the fact to connect to additional communication modes as desired.

The logic service modules 12 are executable to control a portion of one or more dynamic operator sessions. When a message arrives at one or more of the logic service modules 12, a session is created for the contacting party between the contacting party and an operator or other client user using one or more client applications 11. The client applications may include both a client UI 11a and an audio node 11b and/or other media node, and a client adapter 14k mediates the session between the client UI 11a and one or more of the logic service modules 12. Once a session is established, if it is determined that media is being included, the media service module 12c may connect specifically to the audio node 11b or other media node, and a media stream path is established to the node 11b through the media service module 12c.

Further details of methods for establishing and maintaining a dynamic operator session are described elsewhere herein.

Note that the client UI 11a not only receives data, but may convert and send data to the client adapter 14k much as the gateways 16 convert and send data to their respective adapters 14. Additionally, the gateways 16 may receive data from their respective adapters 14 much as the client UI 11a receives it from the client adapter 14k. In other words, all connections may be bidirectional.

As noted, the logic service modules 12 may include an account service module (not depicted), which tracks which client users are available to join sessions with remote calling units. The logic service modules 12 may include a notification service module 12a, which may send a notification to a specified client to notify the client of a waiting communication, and the type thereof. The logic service modules 12 may include a session service module (not depicted), which may note that a client has received a notification and determine whether it is desirable to begin a dynamic operator session. The notification service module and the session service module may also work in tandem to manage an ongoing session, by coordinating the transmission and confirming the receipt of message content.

Returning to FIG. 2A, the specific components of the particular depicted embodiment will now be described in more detail.

It is noted that many of the blocks in FIG. 2A represent a group of one or more components with similar characteristics. Therefore, for convenience, the numbers in FIG. 2A may be interchangeably used to refer to these components as a group or to any one of these components. Furthermore, unless specified otherwise, it should be assumed that reference to interactions with these components may be with any number of these components, whether one, all, or any subset thereof.

As depicted, a main subsystem 100a of a backend processing system 100 includes one or more core logic service modules 120a and one or more adapters 140a, preferably a plurality of each. The core logic service modules 120a collectively implement the high-level policies and logical rules. The adapters 140a bridge the gap between the logic services 120a and any infrastructure, such as user interface technologies, databases, file systems, and external components and systems, by mediating between the two. In particular, the infrastructures may include both one or more external data gateways 160a and one or more data endpoints 110a, preferably a plurality of each. The main subsystem 100a may also hold the state information (not depicted) necessary for the operation of the core logic service modules 120a.

The adapters 140a may contain both high-level adapter-specific logic and low-level adapter code, wherein the logic binds the adapters 140a to the core logic service modules 120a the code binds the adapters 140a to the various infrastructures. Preferably, the adapters 140a are as stateless as possible, focusing on a robust implementation of any necessary protocols for the various infrastructures.

By employing the adapters 140a, the core logic service modules 140a may be made agnostic as to the surrounding infrastructure and in particular as to the formats of incoming and outgoing communications. Furthermore, testing may occur on the core logic service modules 120a, and on the adapter-specific logic of the adapters 140a, without knowledge of the specific infrastructures; that is, in isolation from these communication modes. Because communication technology and protocols can be expected to change over time, this approach improves adaptability of the system to these changes.

The main subsystem 100a is also in communication with the media subsystem 100b and the support subsystem 100c, each of which will be described in detail further below.

Generally, data, for instance in the form of external messages exchanged with remote caller units, may flow from the external data gateways 160a through the adapters 140a to the core logic service modules 120a. In some embodiments, each external data gateway 160a may be assigned to a particular adapter 140a.

Upon receiving data, an adapter 140a sends a notification to the core logic service modules 120a. More specifically, the adapter 140a may select one or more of the core logic service modules 120a, as appropriate to the specifics of the data, to send the notification to. Said core logic service modules 120a execute the necessary logic, based on the current state of the core logic service modules 120a and the received notification. This may, for instance, result in a state change in the state information, a notification to one or more other adapters 140a, or both. If other adapters 140a receive a notification from the core logic service modules 120a, they may then send a message forward to one or more data endpoints 110a.

Data may similarly flow in the other direction, from the data endpoints 110a to the adapters 140a to the core logic service modules 120a to the adapters 140a to the external data gateways 160a. Additionally, in some embodiments and implementations, the core logic service modules 120a may in some circumstances respond back in the direction from which data was received; that is, data originating from an external data gateway 160a may result in data sent to an external data gateway 160a, or from a data endpoint 110a to another data endpoint 110a.

The data may be converted from one data protocol or format to another by the external data gateways 160a, the adapters 140a, the data endpoints 110a, or any combination thereof. For instance, in the depicted embodiment, the external data gateways 160a convert between external formats of various external messages and an internal backend format P3 of internal messages. P3 may be an IP based protocol. Likewise, the data endpoints 110a convert between endpoint formats of external messages and P3. P3 is used to communicate with the adapters 140a, which convert the messages further to a high level format P4 of notifications for communication with the core logic service modules 120a, and then convert from P4 back to P3 when sending communications from the core logic service modules 120a to the external data gateways 160a or data endpoints 110a. P4 may be a middleware communication protocol.

Figure 2B:
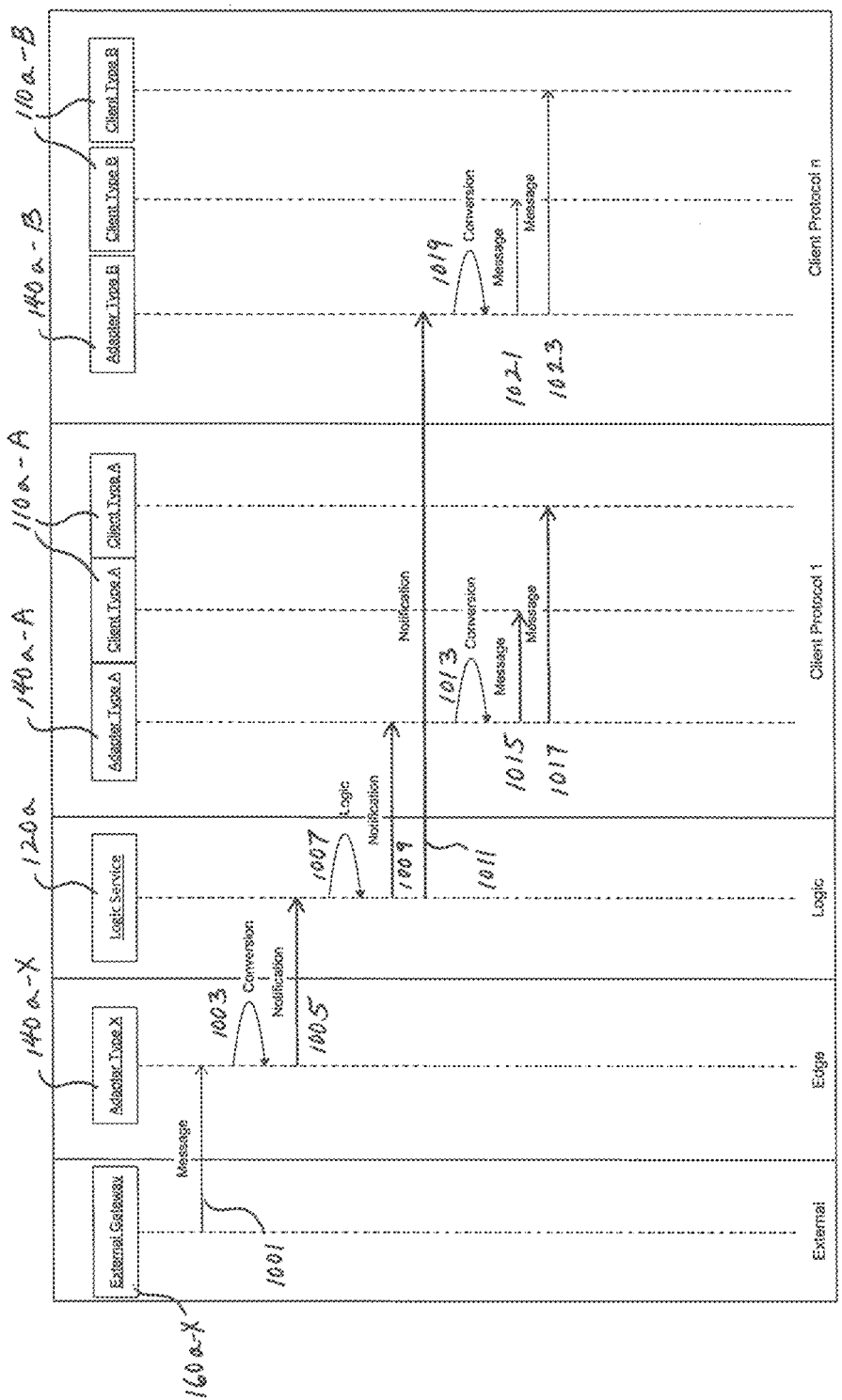
FIG. 2B is a data flow diagram illustrating an example data message flow within the architecture depicted in FIG. 2A.

FIG. 2B is a data flow diagram depicting an example data message flow, in accordance with an embodiment of the invention. As depicted in FIG. 2B, data received by an external gateway 160a-X is sent in a message form to an adapter 140a-X, at 1001. The adapter 140a-X is tailored to process messages to and from external gateway 160a-X— that is, messages of communication mode X—and converts the message to a notification at 1003. The notification is then sent to a logic service module 120a at 1005.

The logic service module 120a considers the notification according to its logic at 1007, and determines that messages should be sent via two adapters, 140a-A and 140a-B, each of which are tailored to process messages to and from data endpoints of type A and B, respectively. Therefore, at 1009, the logic service module 120a sends a notification to the adapter 140a-A, and at 1011, it sends a notification to the adapter 140a-B.

At 1013, the adapter 140a-A converts the notification to a message in a protocol appropriate to an endpoint of type A, such as Client Protocol 1. It then sends the message to two data endpoints 140a-A, each of type A, at 1015 and 1017. Likewise, at 1019, the adapter 140a-B converts the notification to a message in a protocol appropriate to an endpoint of type B, such as Client Protocol n, and sends the message to two data endpoints 140a-B, each of type B, at 1021 and 1023.

Figure 2C:
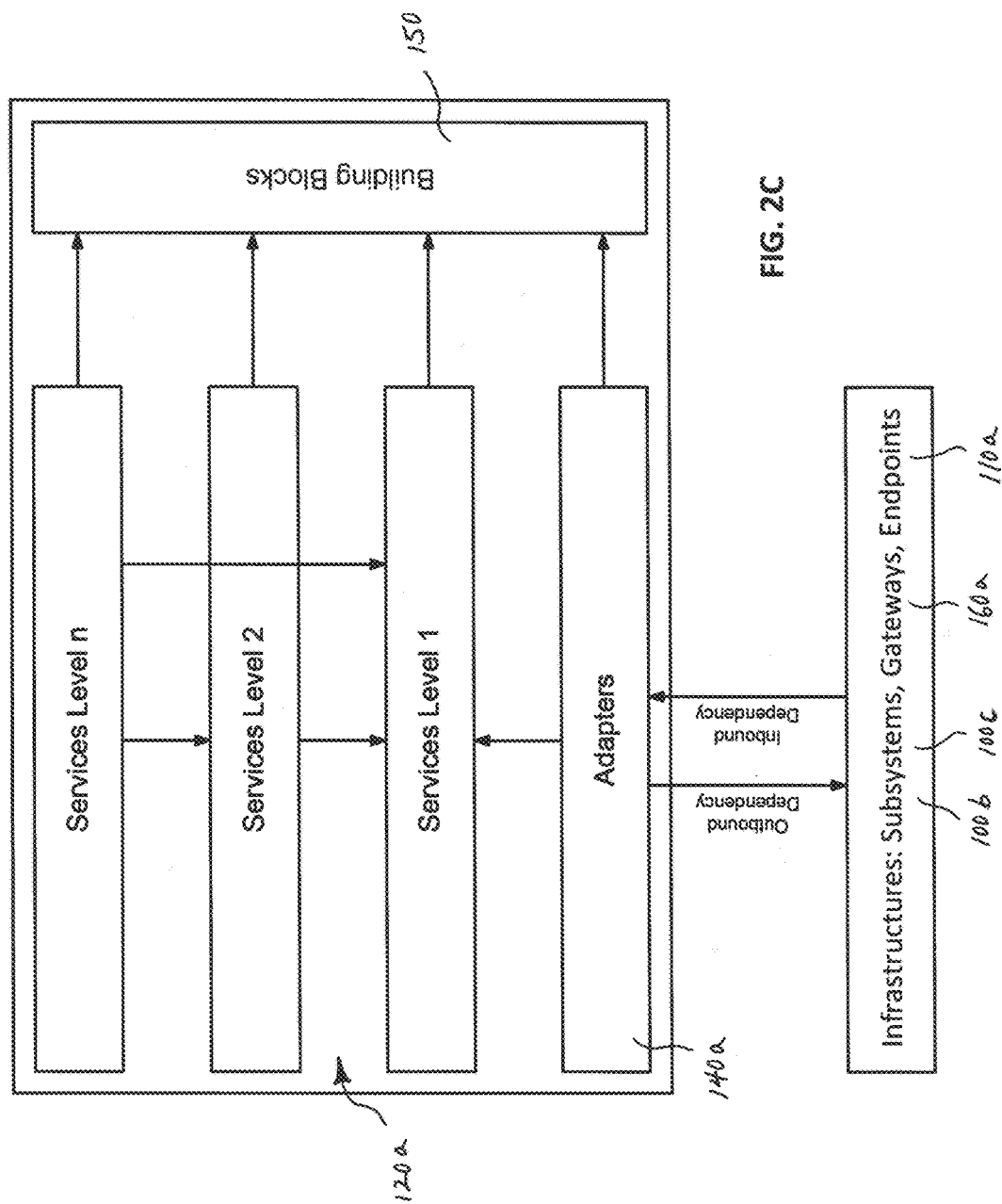
FIG. 2C is a block diagram illustrating interactions between levels of dependency within the code of the architecture depicted in FIG. 2A.

In some embodiments, the core logic service modules 120a may have their respective services divided into a plurality of service levels, each level containing one or more specific services which may be called, and each level representing an increased abstraction of logic in said services. These levels are depicted in the diagram of FIG. 2C. Of these service levels, the code of the adapters 140a may only depend on services in the first level, which represent lower level functionality like connecting media streams, managing user sessions and the like. Additionally, of these services, each service may only depend on services in a lower level, not those of an equal or higher level. The adapters 140a may also depend upon the various infrastructures (which include media subsystem 100b and support subsystem 100c, data gateways 160a, and data endpoints 110a), or vice versa as appropriate to the infrastructure, and all adapters and service levels may depend on a set of application development building blocks 150. This approach prevents circular dependencies from developing within the core logic service modules 120a.

Returning to FIG. 2A, the media subsystem 100b of the backend processing system 100 is in communication with the main subsystem 100a through one or more adapters 140a, specifically those which shall be referred to as media adapters. As depicted, this communication is through the same protocol P3 used to communicate with the external data gateways 160a and data endpoints 110a, and this shall be presumed from here on; however, this is not required. P3 may be an IP based protocol.

The media subsystem 100b may also be in communication with one or more external media gateways 160b and one or more media endpoints 110b. Communication with the external media gateways 160b and the media endpoints 110b may be achieved through a media streaming protocol P1, such as Real-time Transport Protocol (RTP) or Secure Real-time Transport Protocol (SRTP), and a signaling protocol P2, such as Session Initiation Protocol (SIP) or Transport Layer Security (TLS).

The media subsystem 100b may include one or more media service modules and components 120b, each of which may interact with P1 or P2 and thereby provide media streaming or signaling services, respectively. In the depicted embodiment, media steaming service modules and components include a gateway media mixer module 121, which may adaptively mix media streams into one stream for one external media gateway 160b, a conference media mixer module 122, which may conference media streams to create single-stream summaries, and a client media mixer module 123, which may adaptively mix media streams into one stream for one media endpoint 110b. Steaming service modules and components may also include an interactive voice responder (not depicted), which may generate and provide announcement services to external media gateways 160b. In the depicted embodiment, signaling service modules and components include a state agent module 124, which may provide information about the current states of connected media consumers and producers, a back-to-back user agent (B2BUA) module 125, which may mediate between media participants, and a registrar module 126, which may hold a list of currently active media participants.

Through the media adapters, the media subsystem 100b selectively delivers predetermined media information, including portions of messages or media content, to the main subsystem. For instance the media subsystem 100b may inform the main subsystem 100a about media activity arriving through the external media gateways 160b and the media endpoints 110b, and requests media routing and other logic decisions. The main subsystem 100a may in turn access media functionality, including both media streams and the corresponding signaling, through the media adapters (e.g. volume control for a media streaming coupling point, acceptance of a media stream). However, the stream and signals themselves may travel from the external media gateways 160b to the media endpoints 110b or vice versa without being directly processed by the adapters 140a or core logic service modules 120a.

The support subsystem 100c of the backend processing system 100 is in communication with the main subsystem 100a through one or more adapters 140a, specifically those which shall be referred to as support adapters. As depicted, this communication is through the same protocol P3 used to communicate with the external data gateways 160a and data endpoints 110a, and this shall be presumed from here on; however, this is not required. P3 may be an IP based protocol.

The support subsystem 100c may also be in communication with one or more external support gateways 160c and one or more support endpoints 110c. Communication with the external support gateways 160c and the support endpoints 110c is achieved through a general data protocol. As depicted, this communication is through the same protocol P3 used to communicate with the external data gateways 160a and data endpoints 110a, and this shall be presumed from here on; however, this is not required.

The support subsystem 100c may include one or more support service modules and components 120c, each of which may interact with P3 and provide support or management services. In the depicted embodiment, support service modules and components include a static data storage component 127, which may provide persistence services for data, an index component 128, which may provide access to indexed data, like full text search, an intersite connectivity module 129, which may provide intersite WAN replication functionality, and a geographic information system module 133, which may provide geological and spatial data and functionality, as well as front end map components. In the depicted embodiment, management service modules and components include a configuration module 131, which may provide services and components for configuring services in the three subsystems 100a, 100b, and 100c (e.g. operational and technical configuration), and a monitoring module 132, which may provide services and components for monitoring services in the three subsystems 100a, 100b, and 100c (e.g. operational and technical monitoring).

Through the support adapters, the support subsystem 100b informs the main subsystem 100a about support activity arriving through the external support gateways 160b and the support endpoints 110b, and requests logic decisions. The main subsystem 100a may in turn access support functionality through the support adapters (e.g. data persistence, full text search). However, the support data itself may travel from the external support gateways 160c to the support endpoints 110c or vice versa without being directly processed by the adapters 140a or core logic service modules 120a.

The support subsystem 100c may also provide modules and components, for instance the configuration module 121 and monitoring module 132, which can be used by the core logic service modules 120a in the main subsystem 100a. These may be provided in the form of reusable libraries and directly embedded into the respective services, and may be thereby accessed without adapters.

Dynamic Operator Sessions

The disclosed system provides for such flexibility with regard to different end user devices and their simultaneous use through dynamic operator sessions. Each dynamic operator session represents a set of one or more logical UI and/or streaming clients packaged into one or more deployment artifacts and deployed to one or more physical appliances. Each dynamic operator session maintains the current state of these devices, the currently handled media streams, as well as the data/signaling subscriptions currently active for an operator. The dynamic operator session may also contain information about selected role(s), skills of a logged on operator, and other static and runtime information attached to the operator. The state of the dynamic operator session is held in the backend processing system, preferably within the core logic service modules of the main subsystem.

Figure 4:
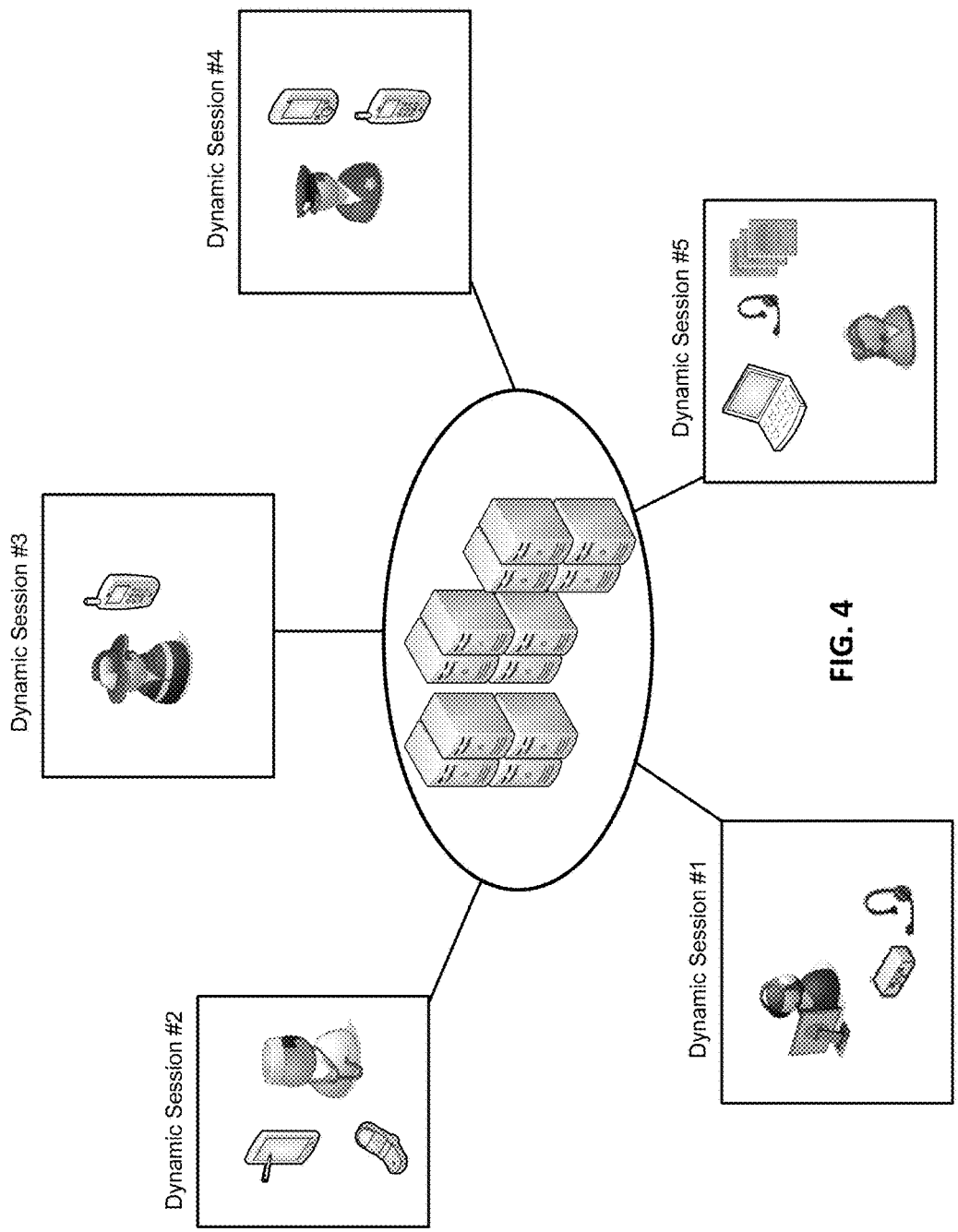
FIG. 4 is a schematic diagram illustrating an example scenario where dynamic operator sessions are concurrently active, in accordance with one exemplary embodiment of the present invention.

FIG. 4 schematically illustrates an example where five dynamic operator sessions are generated to be concurrently active. In this example, dynamic operator session #3 uses but one physical endpoint device (a mobile telephone device) available to an operator, while session #5 uses five physical endpoint devices (a laptop, a headset, and three loudspeakers) available to the operator.

Figure 5:
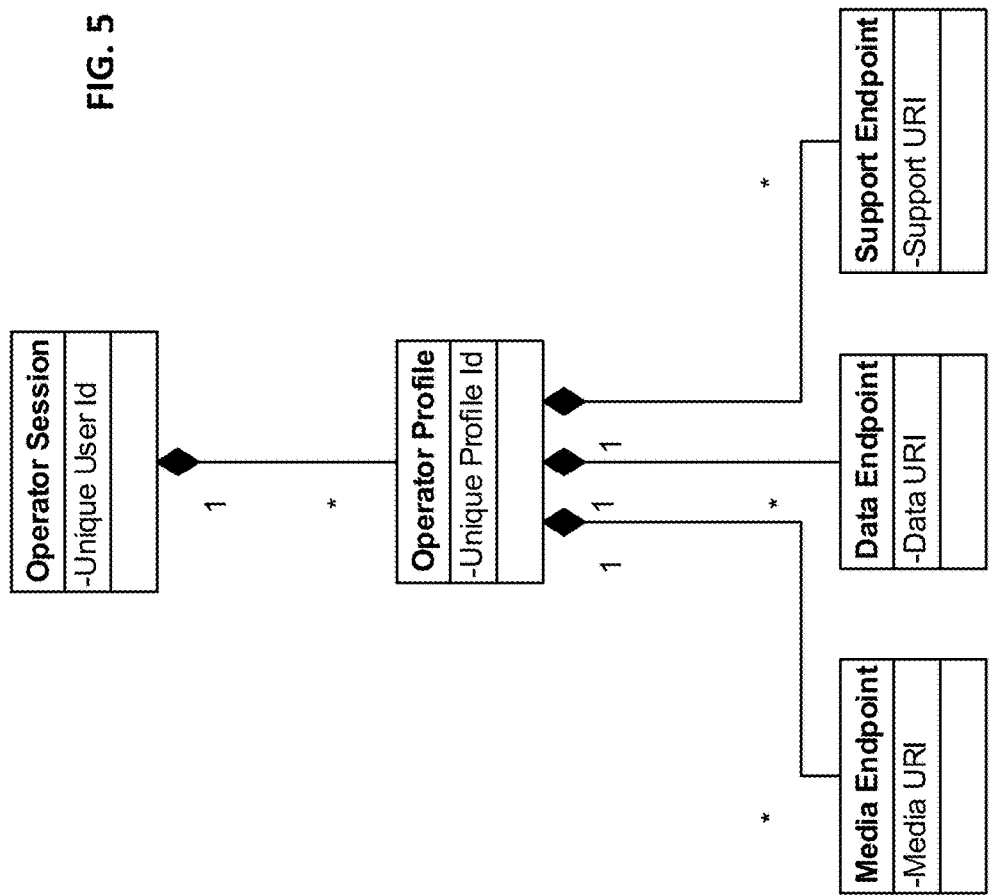
FIG. 5 is a schematic diagram illustrating a structure of an operator session with one operator profile, in accordance with one exemplary embodiment of the present invention.

As illustrated, each dynamic operator session groups various multimedia endpoints, data endpoints, and support endpoints into one logical operator session. This relationship is further illustrated in FIG. 5, where a session may be defined by multiple operator profiles. Each operator profile may group together multiple media endpoints, data endpoints, and/or support endpoints, and represents one working environment for the given operator. Such assignment of endpoint devices to operator profiles is necessary because not all combinations of endpoints make sense from an ergonomic point of view. By grouping endpoints to particular operator profiles, the system is adapted to utilize for the operator a set of endpoints that make sense for the current task at hand.

An operator may, at any time, add or remove endpoint devices from his or her dynamic operator session as well as add additional operator profiles. This dynamic operability of communication sessions with other parties like callers and first responding personnel preserves optimum flexibility and seamless system integration of operator tasks involving different communications equipment.

The following example illustrates the case of adding an additional operator profile. Consider a case where an operator (John Doe) is logged in to his standard working position at his workstation. This may entail, for example, running a computer platform such as a suitably equipped personal computer (PC) to execute the following set of applications:

A call taking client;
A CAD client;
An online status client;
A media device equipped with an USB headset and an USB loudspeaker.

Suddenly, the operator gets called into a major crisis scenario and needs to switch to a mobile radio dispatching working position, utilizing an available tablet device to execute the following applications running thereon:

A radio dispatching client with integrated WebRTC media device.

Figure 6:
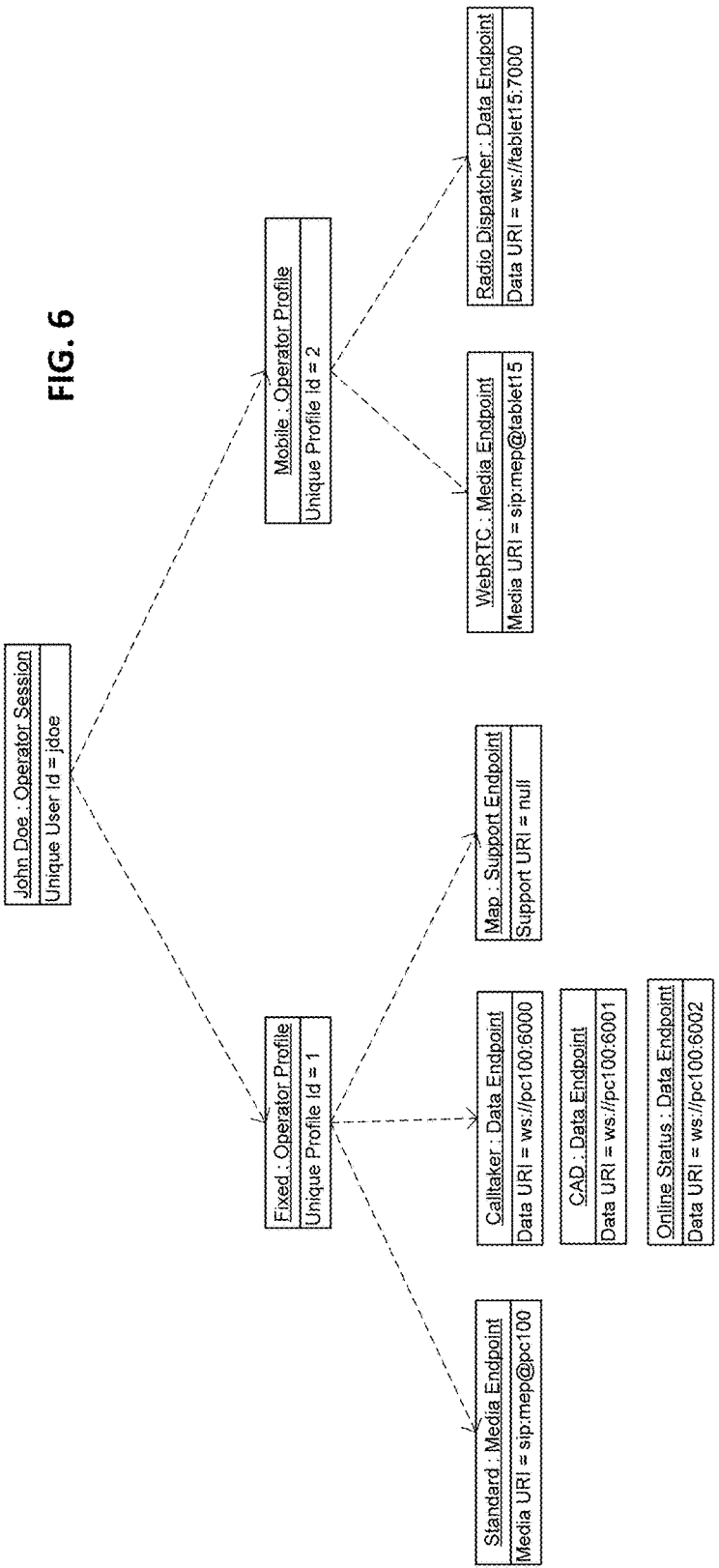
FIG. 6 is a schematic diagram illustrating a structure of an operator session with multiple concurrent operator profiles, in accordance with one exemplary embodiment of the present invention.

The operator may remain logged in at the fixed working position on the first dynamic operator session, and in addition log in from the tablet on a second dynamic operator session to focus on the radio dispatching task. FIG. 6 schematically illustrates the multiple/concurrent operator session structure for this example. As shown, the fixed working station position denoted by operator profile id 1 and the mobile dispatch working position denoted by operator profile with id 2 are established to remain concurrently active for the same operator, John Doe, at his operator workstation.

Among other things, the system implemented in accordance with the exemplary embodiment disclosed seamlessly enables highly integrated and versatile operation providing the following advantages:

1. Separation of data, signaling, and media streaming processing for safety critical communication to allow for different transport mechanisms and SLAs for these very different types of information, as well as providing a wide range of options for different end devices.

2. Publishing relevant signaling information from the media subsystem via adapters to the core logic service modules of the main subsystem to allow the core logic services to access all the relevant data and state information of the media subsystem and to react based on this data to aggregate, correlate, and interpret the information received via various communication modes/channels and provide even sophisticated mission/operational logic decisions to all connected services and clients.

3. Publishing relevant signaling information from the support subsystem via adapters to the core logic service modules of the main subsystem to allow the core logic service modules to access all the relevant data and state information of the support subsystem and to react based on this data to aggregate, correlate, and interpret the information received via various channels and even sophisticated mission/operational logic decisions to all connected services and clients.

4. Dynamic operator sessions each representing a set of one or more logical UI and/or streaming clients packaged into one or more deployment artifacts and deployed to one or more physical appliances; wherein each session includes the current state of these devices, the currently handled media streams, as well as the data/signaling subscriptions currently active for the given operator.

5. Combining all modes of incoming data and streaming information for establishing and maintaining dynamic user sessions based on the operational logic decisions obtained.

Universal Session and Notifications Handling Interface

The system's recognition and universal handling of messages exchanged with remote caller units in disparate communication modes are adaptively reflected in the multi-mode user interfaces provided for each dynamic operator session. The dynamic operator sessions adaptively focus on the person with whom the session is active and allows a unified handling of functionality and media pertaining to that person. FIGS. 7A-7H schematically illustrate examples of graphic display windows defined by the multi-mode user interfaces established in connection with sample operator sessions. In certain of the figures, the graphic display window example is shown overlaying a map indicating the remote party location, as provided by a GIS.

Figure 7A:
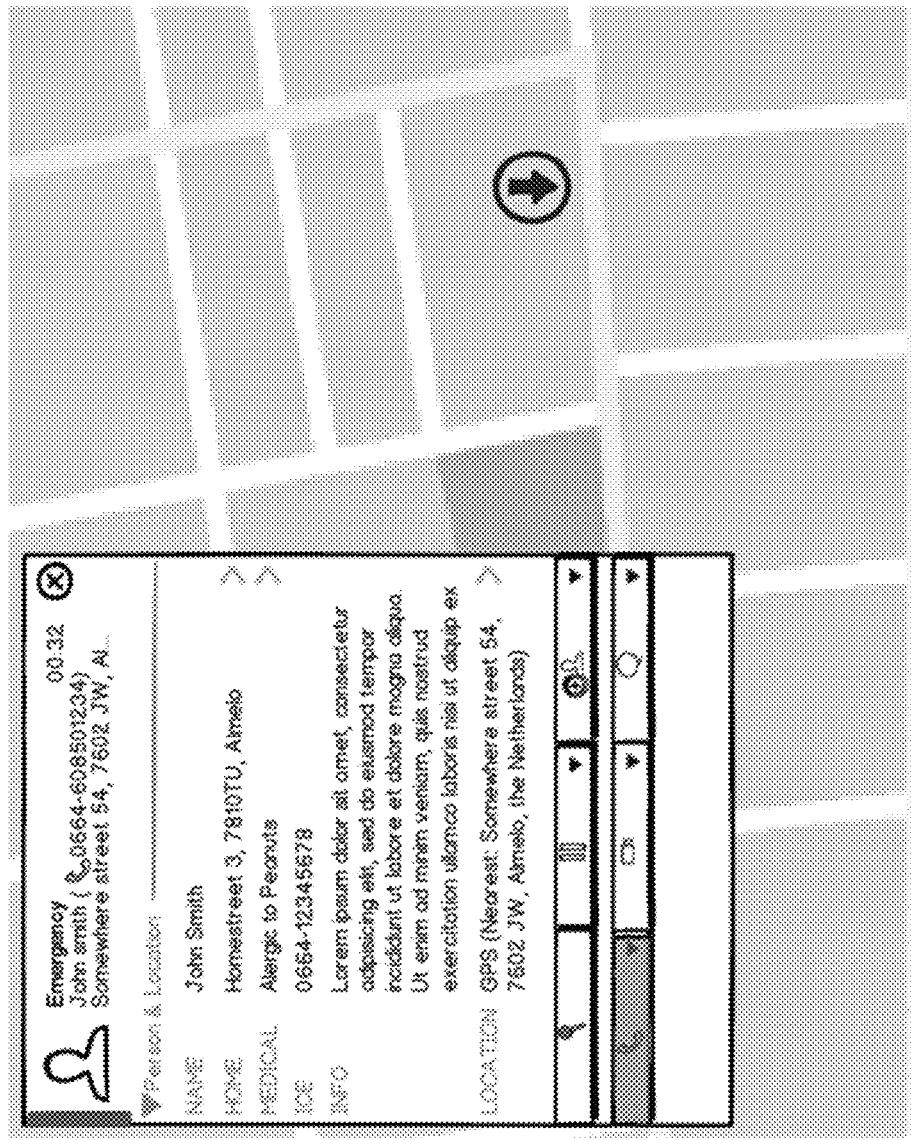
FIGS. 7A-7H illustrate examples of graphic display windows defined by the multi-mode user interfaces established in connection with sample operator sessions, in accordance with one exemplary embodiment of the present invention.
Figure 7B:
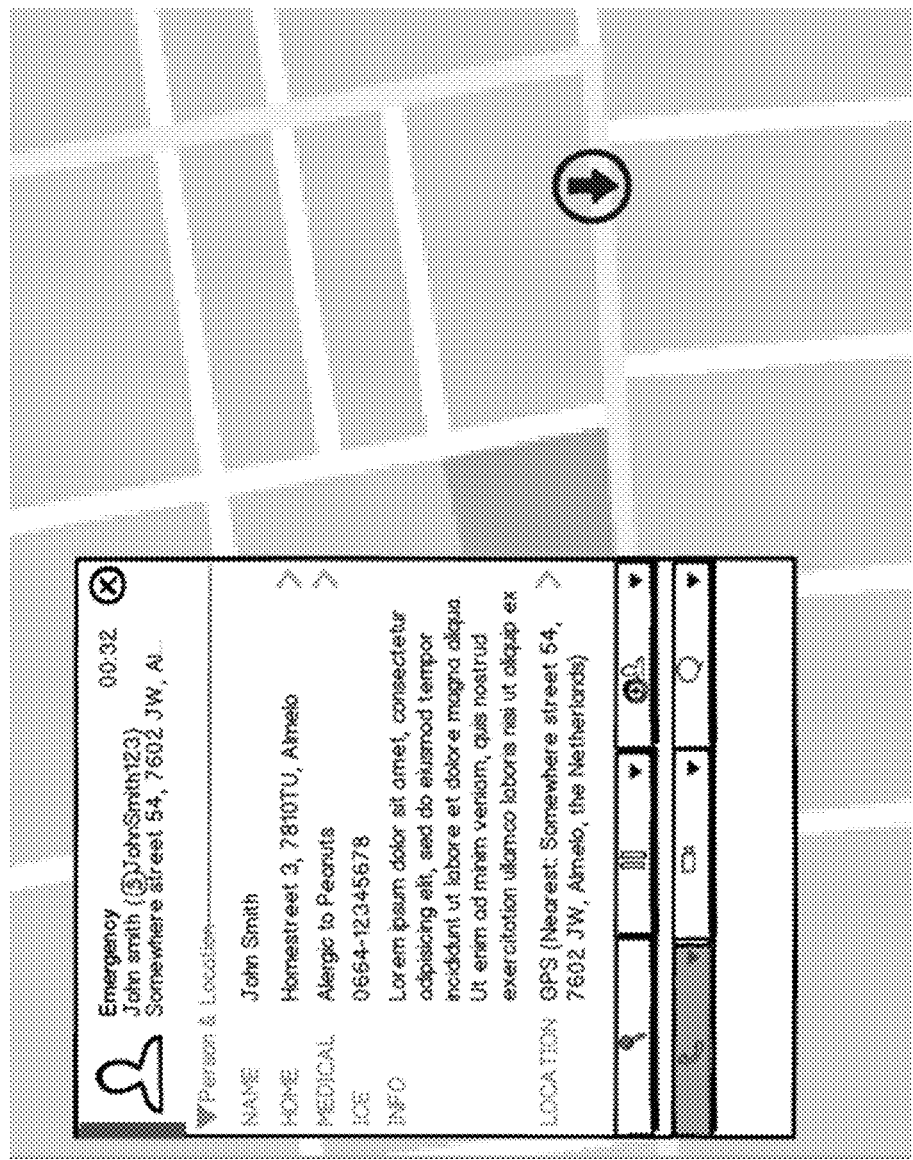
Figure 7C:
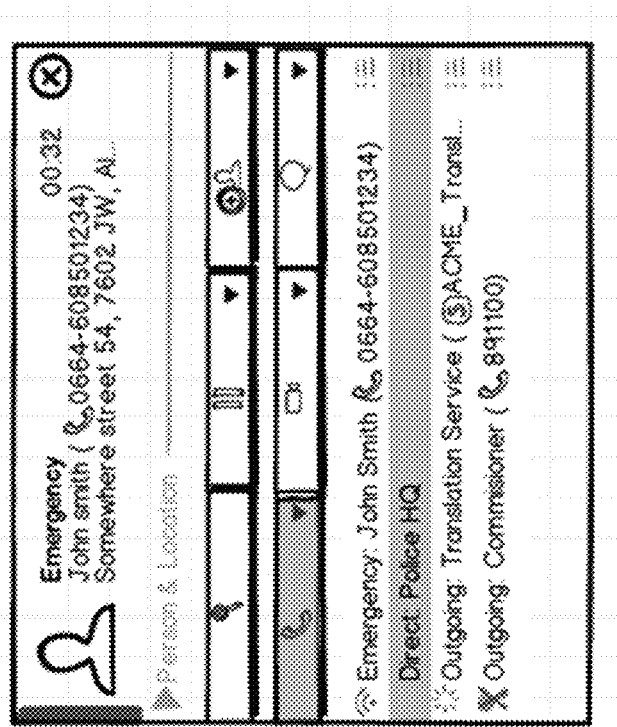
Figure 7D:
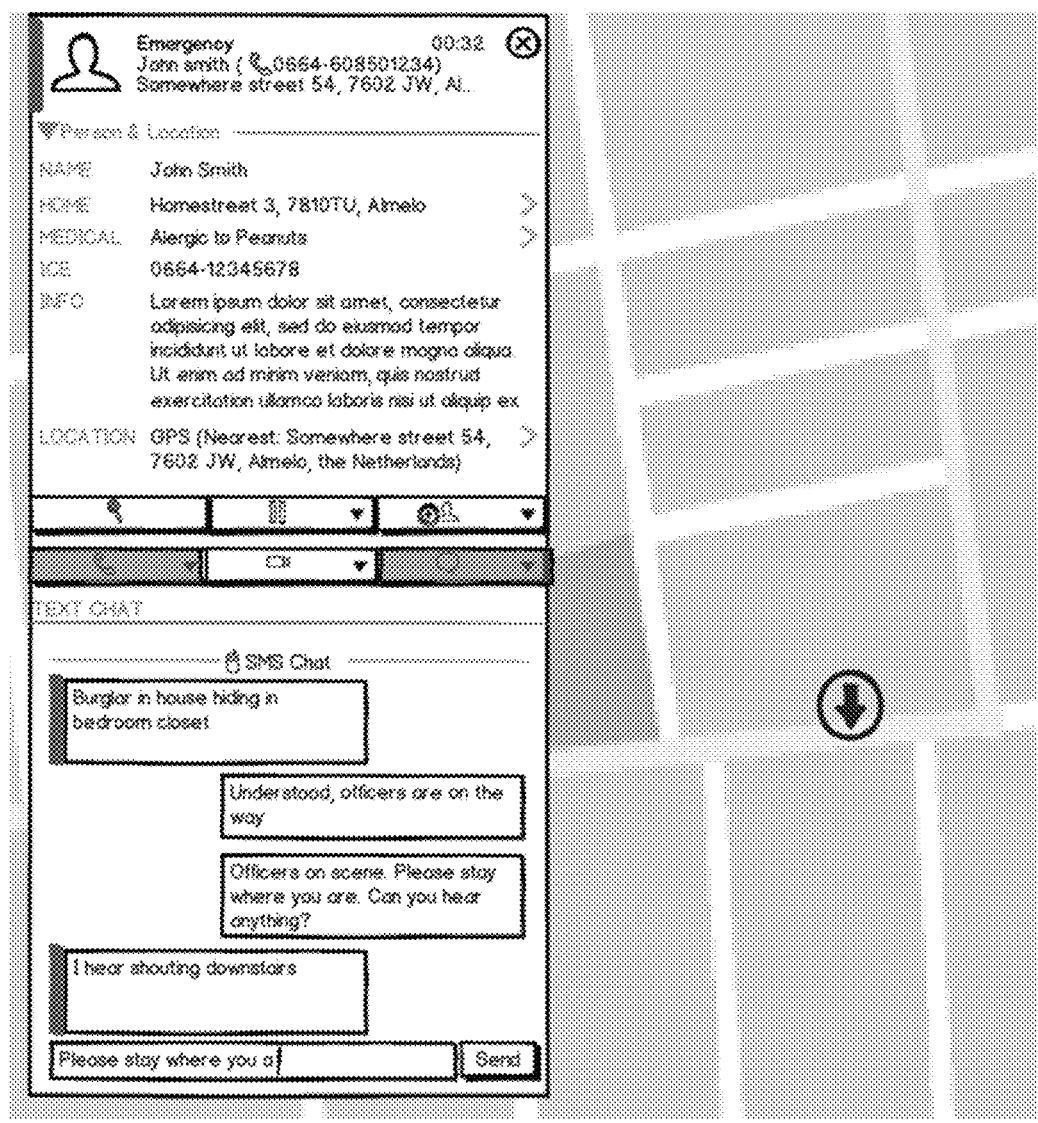
Figure 7E:
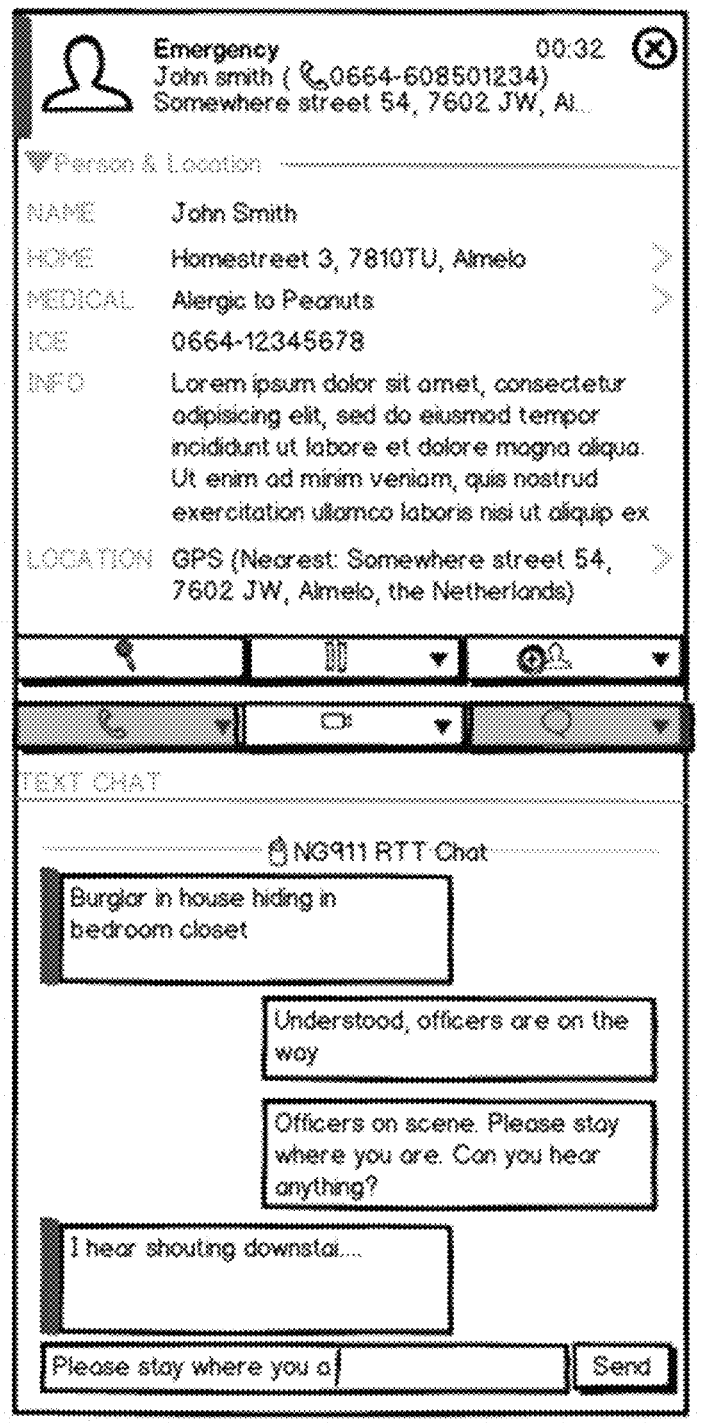
Figure 7F:
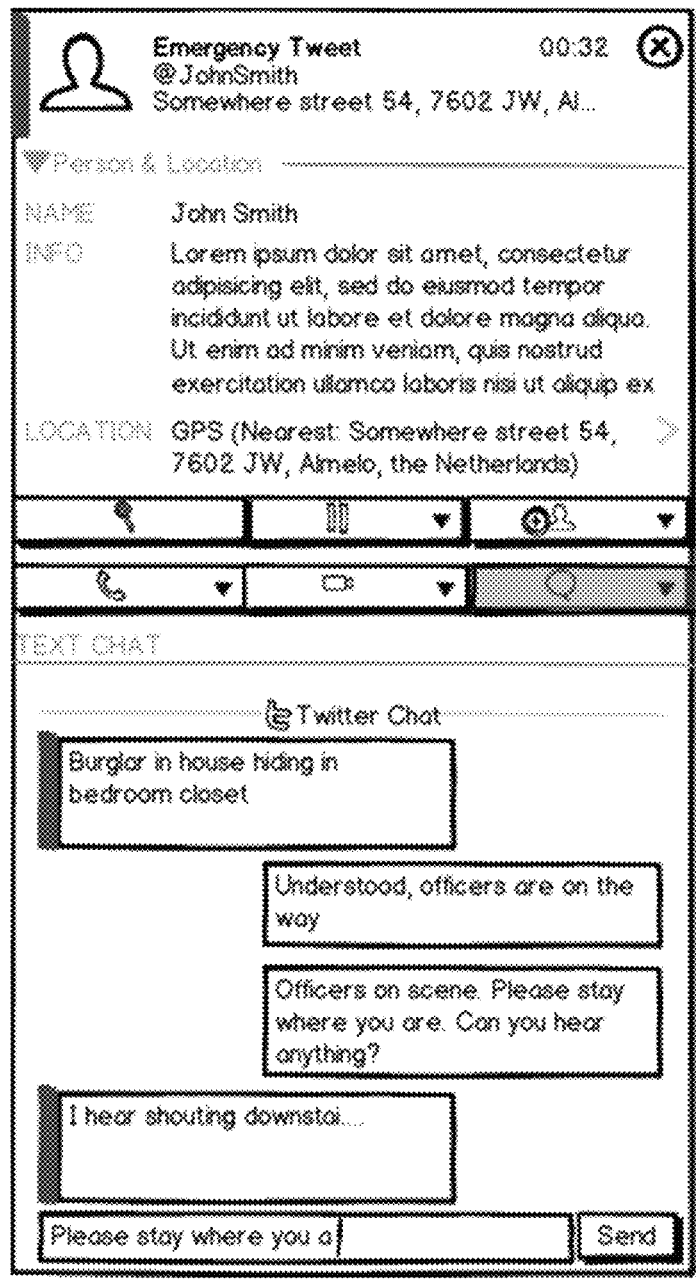
Figure 7G:
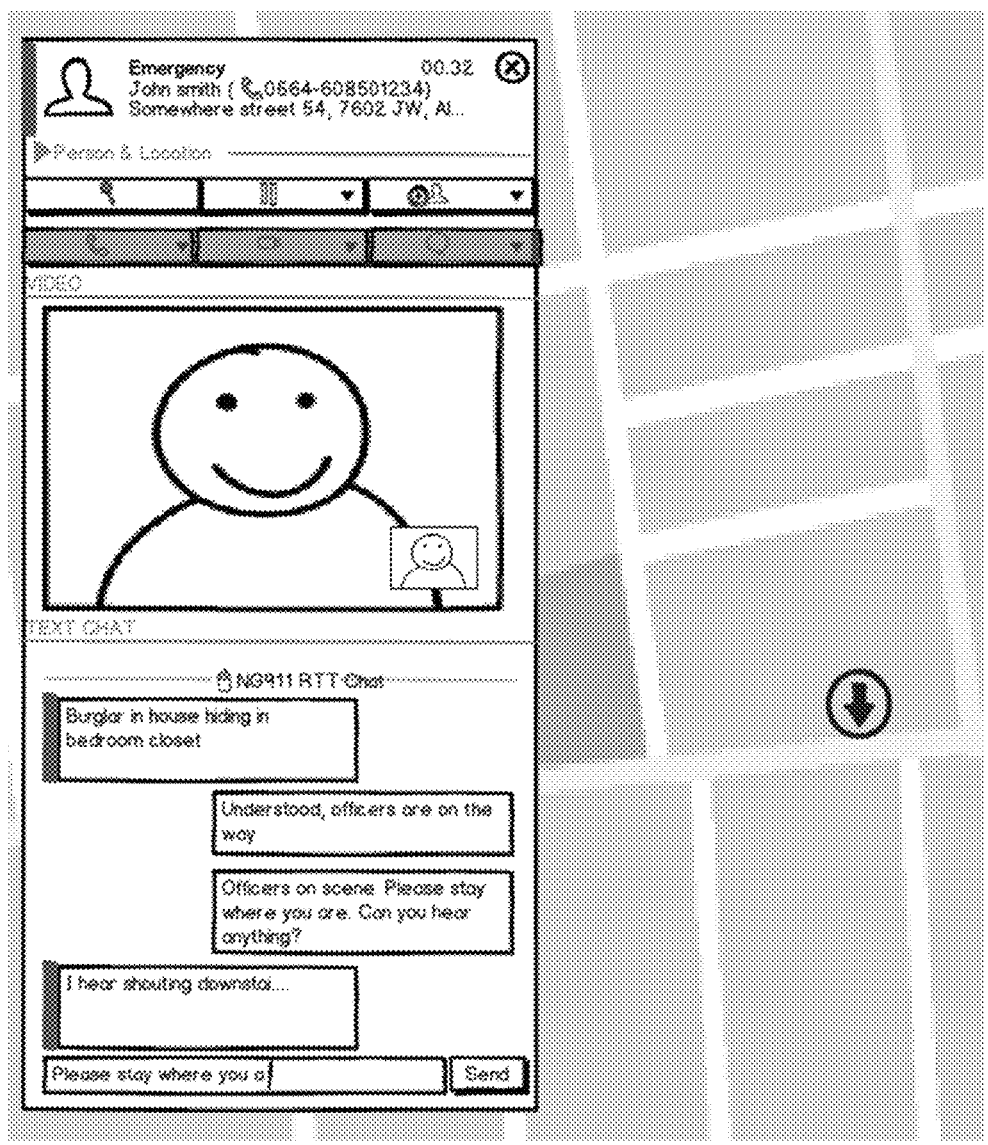

In the example of FIG. 7A, an operator workstation accepts a normal telephony session with a calling person a given session notification, and opens a session panel on which a graphic window is displayed as illustrated, overlaying a map showing the caller's identified location. The caller's location is highlighted on the map, and the session user interface displays all relevant information in a compact manner. There is no difference in handling and presenting the relevant information with the particular communication service through which the telephony-style call may have been received. Even if the call were received through internet-based services such as SKYPE rather than through traditional telephony, the graphic display consistently presents the relevant information, as illustrated in FIG. 7B. If the PSAP operator were to initiate a conference to multiple parties, this is displayed on the session user interface as well, as illustrated in FIG. 7C. If the PSAP operator wishes to start exchanging text messages with the calling person, the 'Text' media menu item on the display window offers the option to do so. When selected, a text chat is displayed on the session user interface, as illustrated in FIG. 7D, with the original display window accordingly extended or supplemented. If the contact was established using NG911/112 measures, a Real Time Text (RTT) mode becomes available for associated use, as illustrated in FIG. 7E. If the calling person is known by the PSAP to have a particular social media account like a TWITTER account, or if the person contacts the PSAP using a direct social media message, the conversation is similarly handled, as illustrated in FIG. 7F.

Video message contents may be readily added to the session user interface by the system. If the caller contacts the PSAP through a communication mode that enables video contents (a call via NG911/112 for example), and either the caller's device (remote caller unit) used support video calls or the caller's contact information is known to the PSAP, the operator may add video content to the session user interface by selecting a 'Video' media menu item. The resulting graphic display is illustrated in FIG. 7G.

Figure 7H:
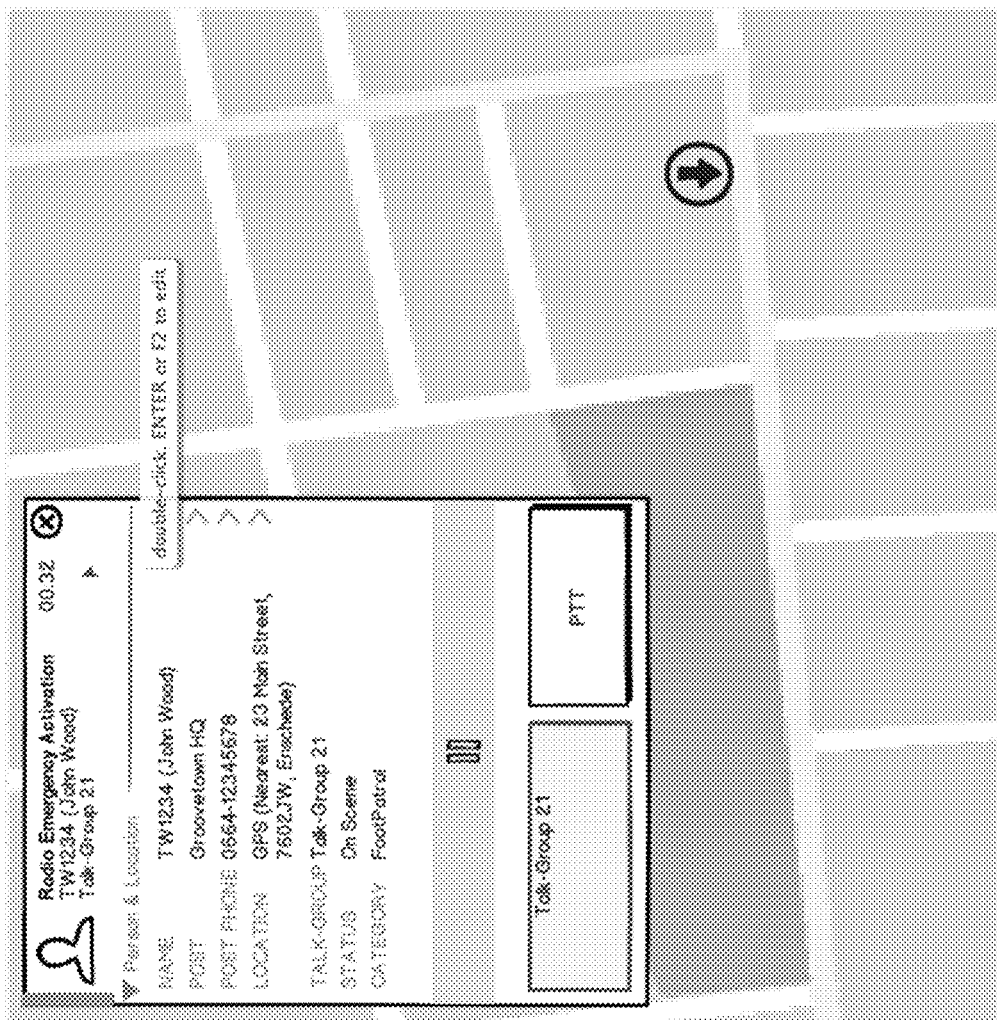

If the given dynamic operator session was initiated by a radio Emergency Activation (EMA), the user interface presentation at the PSAP operator workstation is preferably much the same as for calls from the public. However, radio system- or other mode-specific information and functionality are accordingly displayed. As illustrated in FIG. 7H, for instance, the first responder's identifying information and radio talk-group are presented for immediate use by the operator.

These examples of FIGS. 7A-7H demonstrate the adaptively integrated handling of media/services of a dynamic operator session a person (through their remote caller units). The composite user interface presentation to the operator of information and available functionality is context sensitive. The presentation is preferably also location-driven, freeing the operator to carry on convenient yet efficient person-focused conversation handling.

The system's adaptive integration of information exchanged with remote parties in disparate communication modes includes in certain embodiments the adaptively integrated presentation of notifications as to new media/service events of note to a particular PSAP operator and the location-driven presentation thereof as well. This entails the prompt universal notifications to a PSAP operator workstation of incoming events that the particular workstation's operator needs to know about and/or respond to. The location of each notification is preferably also routed to the given operator's then-active working position for display on a map.

Figure 8A:
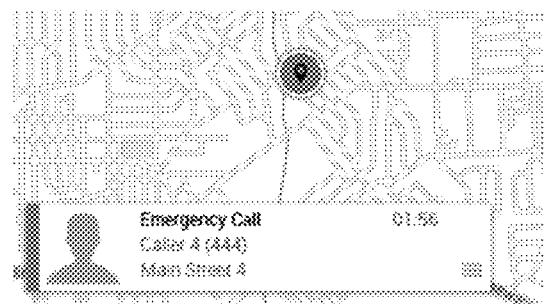
FIGS. 8A-8F illustrate examples of graphic display windows defined by the multi-mode user interfaces established in connection with sample operator sessions and updated with various notifications, in accordance with one exemplary embodiment of the present invention.
Figure 8B:
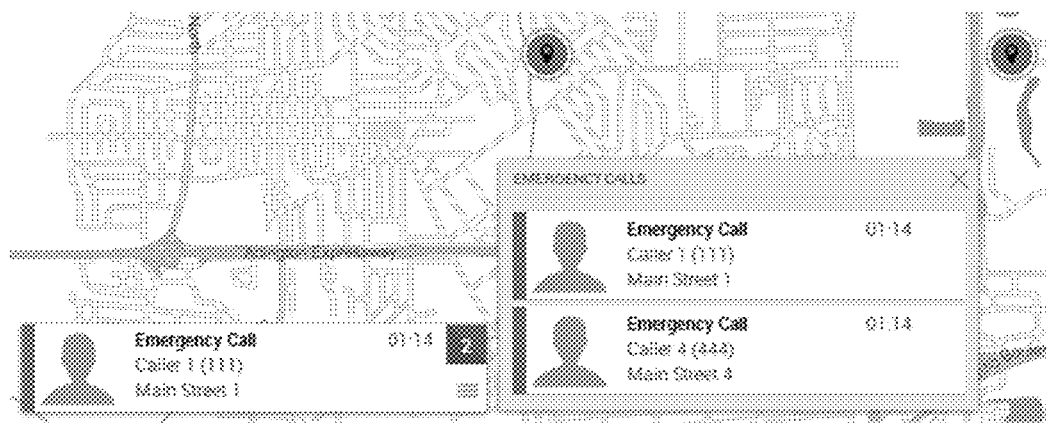
Figure 8C:
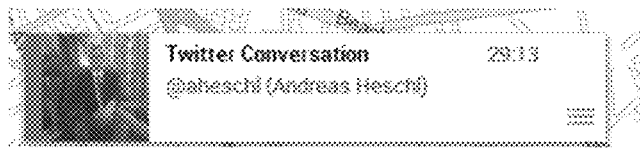

FIGS. 8A-8F schematically illustrate examples of graphic display windows defined by the multi-mode user interfaces established in connection with sample operator sessions, updated with various notifications presented to the operator at different stages of operator working position. In its basic form, a new incoming call event notification is transmitted to the given PSAP operator workstation, and a marker is placed on a map to indicate the call originating location, as illustrated in FIG. 8A. Notifications of different communication media/service modes may be assigned certain priorities and group identities. If multiple events belonging to the same group are routed to the PSAP operator's position, they are preferably presented in a 'stacked' way, such that the operator may inspect all pending notifications in this stack, as illustrated in FIG. 8B. Similarly, if a message from a social media service is waiting (e.g. TWITTER), it is displayed such as illustrated in FIG. 8C. These messages by configuration may be grouped with, for instance, emergency call events and routed accordingly.

Figure 8D:
Figure 8E:
Figure 8F:
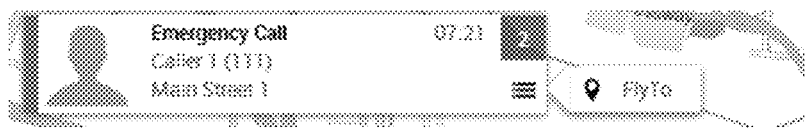

If a first responder sends a status message such as a 'call back request' from a radio mobile, a notification is displayed to the user in a similar manner as incoming calls. This is illustrated in FIG. 8D. If a first responder initiates an emergency call from a radio mobile, a corresponding notification is displayed to the user as illustrated in FIG. 8E.

For each notification a set of functions are preferably made available. Notification-specific functions like 'Accept,' 'Reject,' 'Fly to,' or the like may be displayed in the notification display window. The 'Accept' function may be configured for access simply by pressing the notification itself. The other functions may be configured for access via a context menu button provided on the notification display window, as illustratively highlighted in FIG. 8F.

The graphic display windows illustrated in FIGS. 7A-7H and 8A-8F are but examples, and numerous other types and configurations of graphic display windows may be defined by the multi-mode user interfaces established in accordance with the illustrated embodiment, for various applications thereof.

The multi-mode user interfaces provided for each dynamic operator session yield one or more of the following advantages:
- Presenting in a unified manner information pertaining to the person with whom the communication session is established;
- Presenting in a unified manner the Person's available profile information;
- Presenting on the map the Person's provided location;
- Presenting those functions applicable to the communication media and service through which the session has been established;
- Presenting those functions applicable if the communication media and service stems from TETRA public safety radio communication systems;
- Presenting those functions applicable if the communication media and service stems from LTE-based public safety radio communication systems;
- Presenting in a unified manner ways to add or remove Voice, Video, and/or Text media delivered via respective services from the session;
- Presenting ways to handle conferences using different communication media in a session;
- Presenting in a unified manner incoming communication media/service contact request events via corresponding notifications;
- Defining a priority and grouping for each available communication media/service contact request mode;
- Presenting in a unified manner multiple notifications belonging to the same group in a stack;
- Presenting on the notification in a unified manner a contacting person's identity and/or contact Unique Reference Identifier;
- Presenting on the notification in a unified manner the contacting person's location;
- Providing graphic operator access to a notification-specific set of functions like accept, reject, and show location;
- Presenting on a map the contacting person's provided location.

The descriptions herein illustrate possible implementations in certain exemplary embodiments of the present invention and are not limiting. Preferably, the disclosed method and system features, modules, units, and/or subsystems are wholly or partially programmably implemented in computer based systems known in the art having one or more suitable processor, memory/storage, user interface, and other components or accessories required for the particular applications intended. Suitable variations, additional features, and functions known to those skilled in the art are contemplated, consistent with the technological state of the art.

Thus, although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular combinations of method steps may be reversed or interposed, all without departing from the spirit or scope of the invention as defined in the appended claims.

What is claimed is:

1. A system for universal public access communication adaptively integrating disparate modes of communication, comprising:
    at least one operator workstation linked to a public access point for selective interactive communication with remotely disposed caller units in a plurality of selectable communication modes, the communication modes including at least: predetermined voice, data, communication media, and communication service transmissions; and,
    a backend processing system for the public access point, said backend processing system executing to adaptively generate dynamic operator sessions for said operator workstation with the remote caller units, each dynamic operator session selectively integrating one or more of the communication modes to preserve compatibility with external messages transmitted by the remote caller units, said external messages collectively having a plurality of external message formats, said backend processing system including:
        a plurality of logic service modules each executable to control a portion of the dynamic operator sessions;
        a plurality of gateways respectively configured to convert between the external messages exchanged with remote caller units in the communication modes and corresponding internal messages having at least one predetermined backend format different from the external message formats; and,
        a plurality of adapters executing to mediate between said gateways and logic service modules, said adapters selectively distributing the internal messages from said gateways to one or more of said logic service modules for responsive actuation thereof.

2. The system as recited in claim 1, wherein said backend processing system is configured for a public safety access point; and, said operator workstation generates a multi-mode user interface for each of the dynamic operator sessions, each said multi-mode user interface including combined audio-visual presentation of the external messages exchanged with a remote caller unit during the dynamic operator session in the communication modes selectively integrated thereby.

3. The system as recited in claim 2, wherein each multi-mode user interface includes a graphic user interface portion defining a first user-selectable graphic window compositely displaying the contents of messages exchanged with the remote caller unit in at least two of the communication modes.

4. The system as recited in claim 3, wherein said operator workstation automatically generates a graphic notification window to overlay a portion of the first user-selectable graphic window responsive to an emergency notification message received from a remote caller unit in any of the communication modes.

5. The system as recited in claim 4, wherein a plurality of said graphic notification windows are displayed to provide a visually stacked arrangement of notifications responsive to a plurality of emergency notification messages sequentially received for said operator workstation from one or more of the remote caller units in any of the communication modes.

6. The system as recited in claim 3, wherein said graphic user interface portion defines a second user-selectable graphic window displaying geographic location contents of support messages exchanged with a remote support unit in at least one of the communication modes for a remote caller unit.

7. The system as recited in claim 3, wherein said backend processing system is executable to generate for said operator work station a plurality of concurrently active dynamic operator sessions for interactive communication with at least one remote caller unit and at least one remote first responder unit, operator workstation maintaining a plurality of said multi-mode user interfaces for the concurrently active dynamic operator sessions.

8. The system as recited in claim 7, wherein said backend processing system selectively groups together for each dynamic operator session a plurality of endpoint devices coupled to said adapters for coordinated activation responsive to at least one of said logic service modules, said endpoint devices coupled to said adapters including at least one each of: a media endpoint device, a data endpoint device, and a support endpoint device.

9. The system as recited in claim 2, wherein said logic service modules include: a media service module, a notification service module, a dialogs service module, media service module, account service module, session service module, and a geo-information system service module.

10. The system as recited in claim 1, wherein said backend processing system includes gateways configured for converting external messages transmitted by remote caller units as video media, audio media, electronic mail service, social media service, text service, and instant messaging service messages.

11. A system for universal public access communication adaptively harmonized to disparate modes of communication, comprising:
at least one operator workstation linked to a public access point for selective interactive communication with remotely disposed caller units in a plurality of selectable communication modes, the communication modes including at least: predetermined voice, data, communication media, and communication service transmissions; and,
a backend processing system for the public access point, said backend processing system executing to adaptively generate dynamic operator sessions for said operator workstation with the remote caller units, each dynamic operator session selectively integrating one or more of the communication modes to preserve compatibility with external messages transmitted by the remote caller units, said external messages collectively having a plurality of external message formats, said backend processing system including a main subsystem and a media subsystem, wherein:
said main subsystem includes:
a plurality of core logic service modules each executable to control a portion of the dynamic operator sessions;
a plurality of data gateways respectively configured to convert between the external messages exchanged with remote caller units in preselected ones of the communication modes and corresponding internal messages having a first backend format different from the external message formats; and,
a plurality of adapters executing to mediate between said data gateways and core logic service modules, said adapters selectively distributing the internal messages from said data gateways to one or more of said core logic service modules for responsive actuation thereof; and,
said media subsystem includes:
a plurality of media gateways respectively configured to convert between the external messages exchanged with remote caller units as communication media transmissions and corresponding internal messages having at least a second backend format different from the external message formats and the first backend format; and,
a plurality of media streaming service modules each executable to adaptively mix communication media content of the internal messages of said media gateways, said media streaming service modules preserving compatibility with one or more predetermined media endpoint devices.

12. The system as recited in claim 11, wherein said media subsystem is coupled to selectively deliver predetermined media information to said main subsystem for selective distribution to one or more of said core logic service modules, the predetermined media information selectively including portions of the internal messages or the mixed communication media content thereof from said media subsystem.

13. The system as recited in claim 11, wherein said backend processing system further includes a support subsystem coupled to said main subsystem, said support subsystem including:
a plurality of support gateways respectively configured to convert between the external messages exchanged with remote caller units as communication media transmissions and corresponding internal messages having at least a second backend format; and,
a plurality of support service modules each executable to process the internal messages of said support gateways for selective delivery to said adapters and one or more predetermined support endpoint devices, said support service modules preserving compatibility with said predetermined support endpoint devices.

14. The system as recited in claim 13, wherein:
said backend processing system is configured for a public safety access point, and is executable to generate for said operator workstation a plurality of concurrently active dynamic operator sessions respectively with at least one remote caller unit and at least one remote first responder unit; and, said operator workstation generates a multi-mode user interface for each of the dynamic operator sessions, each said multi-mode user interface including combined audio-visual presentation of the external messages exchanged with a remote caller unit during the dynamic operator session in the communication modes selectively integrated thereby.

15. The system as recited in claim 14, wherein:

each multi-mode user interface includes a graphic user interface portion defining a first user-selectable graphic window compositely displaying the contents of messages exchanged with the remote caller unit in at least two of the communication modes; and, said operator workstation automatically generates a graphic notification window to overlay a portion of the first user-selectable graphic window responsive to an emergency notification message received from a remote caller unit in any of the communication modes.

16. The system as recited in claim 15, wherein said graphic user interface portion defines a second user-selectable graphic window displaying geographic location contents of support messages exchanged with a remote support unit in at least one of the communication modes for a remote caller unit.

17. The system as recited in claim 13, wherein:

said media streaming service modules include: a gateway media mixer module, a conference media mixer module, and a client media mixer module;

said core logic service modules include: a notification service module, and a dialogs service module; and, said support service modules include: a configuration module, a monitoring module, and a geo-information system module.

18. A method for universal public access communication adaptively integrating disparate modes of communication, comprising:

establishing at least one operator workstation linked to a public access point for selective interactive communication with remotely disposed caller units in a plurality of selectable communication modes, the communication modes including at least: predetermined voice, data, communication media, and communication service transmissions;

executing a backend processing system configured for the public access point to adaptively generate for said operator workstation dynamic operator sessions with the remote caller units;

configuring each dynamic operator session to selectively integrate one or more of the communication modes to preserve compatibility with external messages transmitted by the remote caller units, said external messages collectively having a plurality of external message formats;

actuating said backend processing system to selectively execute:

a plurality of logic service modules each executable to control a portion of the dynamic operator sessions;

a plurality of gateways to respectively convert between the external messages exchanged with remote caller units in the communication modes and corresponding internal messages having at least one predetermined backend format different from the external message formats; and, a plurality of adapters to mediate between said gateways and logic service modules, said adapters selectively distributing the internal messages from said gateways to one or more of said logic service modules for responsive actuation thereof.

19. The method as recited in claim 18, wherein:

said backend processing system is configured for a public safety access point, said backend processing system being executed to generate for said operator workstation a plurality of concurrently active dynamic operator sessions respectively with at least one remote caller unit and at least one remote first responder unit; and, said operator workstation is executed to generate a multi-mode user interface for each of the dynamic operator sessions, each said multi-mode user interface including combined audio-visual presentation of the external messages exchanged with a remote caller unit during the dynamic operator session in the communication modes selectively integrated thereby.

20. The method as recited in claim 19, wherein:

each multi-mode user interface is generated to include a graphic user interface portion defining a first user-selectable graphic window compositely displaying the contents of messages exchanged with the remote caller unit in at least two of the communication modes;

said operator workstation is actuated to automatically generate a graphic notification window to overlay a portion of the first user-selectable graphic window responsive to an emergency notification message received from a remote caller unit in any of the communication modes; and, said backend processing system is executed to convert external messages transmitted by remote caller units as video media, audio media, electronic mail service, social media service, text service, and instant messaging service messages.

* * * * *